US012810392B2

(12) United States Patent
Wang et al.

(10) Patent No.: US 12,810,392 B2
(45) Date of Patent: Nov. 24, 2026

(54) SYSTEMS AND METHODS FOR GENERATING A RELIGHTED IMAGE

(71) Applicant: ADOBE INC., San Jose, CA (US)

(72) Inventors: Junying Wang, Los Angeles, CA (US); Jae Shin Yoon, San Jose, CA (US); Jingyuan Liu, Santa Clara, CA (US); Xin Sun, Palo Alto, CA (US); Krishna Kumar Singh, San Jose, CA (US); Zhixin Shu, San Jose, CA (US); He Zhang, San Jose, CA (US); Jimei Yang, Mountain View, CA (US); Yangtuanfeng Wang, London (GB); Nanxuan Zhao, San Jose, CA (US); Simon Chen, San Jose, CA (US)

(73) Assignee: ADOBE INC., San Jose, CA (US)

( * ) Notice: Subject to any disclaimer, the term of this patent is extended or adjusted under 35 U.S.C. 154(b) by 237 days.

(21) Appl. No.: 18/775,063

(22) Filed: Jul. 17, 2024

(65) Prior Publication Data

US 2026/0024171 A1 Jan. 22, 2026

(51) Int. Cl.
*G06T 5/60* (2024.01)
*G06T 5/50* (2006.01)
*G06T 5/77* (2024.01)

(52) U.S. Cl.
CPC .................. *G06T 5/60* (2024.01); *G06T 5/50* (2013.01); *G06T 5/77* (2024.01); *G06T 2207/10016* (2013.01); *G06T 2207/20081* (2013.01)

(58) Field of Classification Search
CPC ......... G06T 15/50; G06T 15/506; G06T 5/77; G06T 3/08; G06T 5/60
See application file for complete search history.

(56) References Cited

U.S. PATENT DOCUMENTS

| | | | | |
|---|---|---|---|---|
| 10,565,758 | B2 * | 2/2020 | Hadap | G06T 11/60 |
| 2024/0212106 | A1 * | 6/2024 | LeGendre | G06T 5/50 |
| 2025/0200723 | A1 * | 6/2025 | Lai | G06T 5/94 |
| 2025/0225697 | A1 * | 7/2025 | Revanur | G06T 11/10 |
| 2025/0285370 | A1 * | 9/2025 | Kocsis | G06T 15/04 |

OTHER PUBLICATIONS

Bi, et al., "Deep 3D Capture: Geometry and Reflectance from Sparse Multi-View Images", arXiv preprint arXiv:2003.12642v2 [cs.CV] Jul. 4, 2020, 17 pages.
Brooks, et al., "InstructPix2Pix: Learning to Follow Image Editing Instructions", arXiv preprint arXiv:2211.09800v2 [cs.CV] Jan. 18, 2023, 15 pages.
Ceylan, et al., "Pix2video: Video Editing using Image Diffusion", arXiv preprint arXiv:2303.12688v1 [cs.CV] Mar. 22, 2023, 14 pages.

(Continued)

*Primary Examiner* — Antonio A Caschera
(74) *Attorney, Agent, or Firm* — F. CHAU & ASSOCIATES, LLC

(57) ABSTRACT

A method, apparatus, non-transitory computer readable medium, and system for image generation includes obtaining an object image and a target lighting indicator, generating a shading map based on the object image and the target lighting indicator, and generating a relighted image based on the object image and the shading map. The relighted image depicts an object from the object image with lighting based on the target lighting indicator.

20 Claims, 18 Drawing Sheets

(56) References Cited

OTHER PUBLICATIONS

Chai, et al., “StableVideo: Text-driven Consistency-aware Diffusion Video Editing”, arXiv preprint arXiv:2308.09592v1 [cs.CV] Aug. 18, 2023, 13 pages.
Debevec, et al., “Acquiring the Reflectance Field of a Human Face”, In SIGGRAPH 2000 Conference Proceeding, pp. 145-156, 2000, 12 pages.
Esser, et al., “Structure and Content-Guided Video Synthesis with Diffusion Models”, arXiv preprint arXiv:2302.03011v1 [cs.CV] Feb. 6, 2023, 26 pages.
Futschik, et al., “Controllable Light Diffusion for Portraits”, arXiv preprint arXiv:2305.04745v1 [cs.CV] May 8, 2023, 10 pages.
Geyer, et al., “TokenFlow: Consistent Diffusion Features for Consistent Video Editing”, arXiv preprint arXiv:2307.10373v3 [cs.CV] Nov. 20, 2023, 13 pages.
Guo, et al., “The Relightables: Volumetric Performance Capture of Humans with Realistic Relighting”, In ACM Transactions on Graphics, vol. 38, No. 6, Article 217, Nov. 2019, 19 pages.
Ho, et al., “Video Diffusion Models”, arXiv preprint arXiv:2204.03458v2 [cs.CV] Jun. 22, 2022, 15 pages.
Horé, et al., “Image quality metrics: PSNR vs. SSIM”, In 2010 20th international Conference on Pattern Recognition, pp. 2366-2369, 2010, 4 pages.
Isola, et al., “Image-to-Image Translation with Conditional Adversarial Networks”, arXiv preprint arXiv:1611.07004v3 [cs.CV] Nov. 26, 2018, 17 pages.
Jafarian, et al., “Learning High Fidelity Depths of Dressed Humans by Watching Social Media Dance Videos”, In Proceedings of the IEEE/CVF Conference on Computer Vision and Pattern Recognition, pp. 12753-12762, 2021, 10 pages.
Ji, et al., “Geometry-aware Single-image Full-body Human Relighting”, arXiv preprint arXiv:2207.04750v2 [cs.CV] Jul. 12, 2022, 24 pages.
Johnson, et al., “Perceptual Losses for Real-Time Style Transfer and Super-Resolution”, arXiv preprint arXiv:1603.08155v1 [cs.CV] Mar. 27, 2016, 18 pages.
Kim, et al., “Diffusion Video Autoencoders: Toward Temporally Consistent Face Video Editing via Disentangled Video Encoding”, arXiv preprint arXiv:2212.02802v2 [cs.CV] Mar. 27, 2023, 16 pages.
Lagunas, et al., “Single-image Full-body Human Relighting”, arXiv preprint arXiv:2107.07259v1 [cs.CV] Jul. 15, 2021, 11 pages.
Li, et al., “Free-viewpoint video relighting from multi-view sequence under general illumination”, In Machine Vision and Applications, 25:1737-1746, 2014, available at https://link.springer.com/article/10.1007/s00138-013-0559-0.
Li, et al., “Learn to Dance with AIST++: Music Conditioned 3D Dance Generation”, arXiv preprint arXiv:2101.08779v1 [cs.CV] Jan. 21, 2021, 15 pages.
Mildenhall, et al., “NeRF: Representing Scenes as Neural Radiance Fields for View Synthesis”, arXiv preprint arXiv:2003.08934v2 [cs.CV] Aug. 3, 2020, 25 pages.
Van den Oord, et al., “Representation Learning with Contrastive Predictive Coding”, arXiv arXiv:1807.03748v2 [cs.LG] Jan. 22, 2019, 13 pages.
Pandey, et al., “Total Relighting: Learning to Relight Portraits for Background Replacement”, In ACM Transactions on Graphics, vol. 40, No. 4, Article 1, 2021, 21 pages.
Papantoniou, et al., “Relightify: Relightable 3D Faces from a Single Image via Diffusion Models”, arXiv preprint arXiv:2305.06077v2 [cs.CV] Aug. 22, 2023, 15 pages.
Perazzi, et al., “A Benchmark Dataset and Evaluation Methodology for Video Object Segmentation”, In Computer Vision and Pattern Recognition 2016, pp. 724-732, 2016, 9 pages.
Pharr, et al., “Physically Based Rendering: From Theory to Implementation”, MIT Press, 2023, available at https://pbr-book.org/.
Ponglertnapakorn, et al., “DiFaReli: Diffusion Face Relighting”, arXiv preprint arXiv:2304.09479v3 [cs.CV] Sep. 7, 2023, 20 pages.
Ramamoorthi, et al., “On the relationship between radiance and irradiance: determining the illumination from images of a convex Lambertian object”, In J. Opt. Soc. Am. A., vol. 18, No. 10, pp. 2448-2459, Oct. 2001, 12 pages.
Ranftl, et al., “Towards Robust Monocular Depth Estimation: Mixing Datasets for Zero-shot Cross-dataset Transfer”, arXiv preprint arXiv:1907.01341v3 [cs.CV] Aug. 25, 2020, 14 pages.
Richardt, et al., “Coherent Spatiotemporal Filtering, Upsampling and Rendering of RGBZ Videos”, In Eurographics 2012, vol. 31, No. 2, 2012 10 pages.
Rombach, et al., “High-Resolution Image Synthesis with Latent Diffusion Models”, arXiv preprint arXiv:2112.10752v2 [cs.CV] Apr. 13, 2022, 45 pages.
Ronneberger, et al., “U-Net: Convolutional Networks for Biomedical Image Segmentation”, arXiv preprint arXiv:1505.04597v1 [cs.CV] May 18, 2015, 8 pages.
Schönefeld, “Spherical Harmonics”, Jul. 1, 2005, 25 pages.
Shuai, et al., “Novel View Synthesis of Human Interactions from Sparse Multi-view Videos”, In ACM SIGGRAPH 2022 Conference Proceedings, pp. 1-10, 2022, available at https://dl.acm.org/doi/10.1145/3528233.3530704.
Song, et al., “Denoising Diffusion Implicit Models”, arXiv preprint arXiv:2010.02502v4 [cs.LG] Oct. 5, 2022, 22 pages.
Sun, et al., “Single Image Portrait Relighting”, arXiv preprint arXiv:1905.00824v1 [cs.GR] May 2, 2019, 12 pages.
Tajima, et al., “Relighting Humans in the Wild: Monocular Full-Body Human Relighting with Domain Adaptation”, arXiv preprint arXiv:2110.07272v2 [cs.GR] Oct. 15, 2021, 12 pages.
Teed, et al., “RAFT: Recurrent All-Pairs Field Transforms for Optical Flow”, arXiv preprint arXiv:2003.12039v3 [cs.CV] Aug. 25, 2020, 21 pages.
BR, et al., “Monocular Reconstruction of Neural Face Reflectance Fields”, arXiv preprint arXiv:2008.10247v1 [cs.CV] Aug. 24, 2020, 10 pages.
Toschi, et al., “ReLight my NeRF: A Dataset for Novel View Synthesis and Relighting of Real World Objects”, arXiv preprint arXiv:2304.10448v1 [cs.CV] Apr. 20, 2023, 11 pages.
Wang, et al., “PVT v2: Improved Baselines with Pyramid Vision Transformer”, arXiv preprint arXiv:2106.13797v7 [cs.CV] Apr. 17, 2023, 8 pages.
Wang, et al., “Learning Unified Decompositional and Compositional NeRF for Editable Novel View Synthesis”, arXiv preprint arXiv:2308.02840v1 [cs.CV] Aug. 5, 2023, 13 pages.
Wen, et al., “Liquid warping GAN: A Unified Framework for Human Motion Imitation, Appearance Transfer and Novel View Synthesis”, arXiv preprint arXiv:1909.12224v3 [cs.CV] Oct. 1, 2019, 11 pages.
Xu, et al., “Deep Image-Based Relighting from Optimal Sparse Samples”, In ACM Transactions on Graphics, vol. 37, No. 4, Article 126, Aug. 2018, 13 pages.
Xu, et al., “Deep View Synthesis from Sparse Photometric Images”, In ACM Transactions on Graphics, vol. 38, No. 4, Article 76, Jul. 2019, 13 pages.
Yang, et al., “Deep Edge Guided Recurrent Residual Learning for Image Super-Resolution”, arXiv preprint arXiv:1604.08671v2 [cs.CV] Jul. 18, 2016, 17 pages.
Zhang, et al., “FaceDNeRF: Semantics-Driven Face Reconstruction, Prompt Editing and Relighting with Diffusion Models”, arXiv preprint arXiv:2306.00783v2 [cs.CV] Dec. 4, 2023, 21 pages.
Zhang, et al., “Editable Free-Viewpoint Video using a Layered Neural Representation”, arXiv preprint arXiv:2104.14786v1 [cs.CV] Apr. 30, 2021, 18 pages.
Zhang, et al., “Neural Video Portrait Relighting in Real-time via Consistency Modeling”, arXiv preprint arXiv:2104.00484v1 [cs.CV] Apr. 1, 2021, 11 pages.
Zhang, et al., “Adding Conditional Control to Text-to-Image Diffusion Models”, arXiv preprint arXiv:2302.05543v3 [cs.CV] Nov. 26, 2023, 12 pages.
Zhang, et al., “The Unreasonable Effectiveness of Deep Features as a Perceptual Metric”, arXiv preprint arXiv:1801.03924v2 [cs.CV] Apr. 10, 2018, 14 pages.
Zhang, et al., “Residual Dense Network for Image Super-Resolution”, arXiv preprint arXiv:1802.08797v2 [cs.CV] Mar. 27, 2018, 10 pages.

(56) References Cited

OTHER PUBLICATIONS

Zheng, et al., “Learning Visibility Field for Detailed 3D Human Reconstruction and Relighting”, arXiv preprint arXiv:2304.11900v1 [cs.CV] Apr. 24, 2023, 13 pages.
Zhou, et al., “Deep Single Portrait Image Relighting”, In International Conference on Computer Vision (ICCV), 2019, 9 pages.
Zhou, et al., “Relightable Neural Human Assets from Multi-view Gradient Illuminations”, arXiv preprint arXiv:2212.07648v3 [cs.CV] Jun. 23, 2023, 13 pages.
Zuo-Liang, et al., “Designing An Illumination-Aware Network for Deep Image Relighting”, arXiv preprint arXiv:2207.10582v1 [cs.CV] Jul. 21, 2022, 16 pages.

* cited by examiner

1500

SYSTEMS AND METHODS FOR GENERATING A RELIGHTED IMAGE

BACKGROUND

The following relates generally to machine learning, and more specifically to image generation using machine learning. Machine learning algorithms build a model based on sample data, known as training data, to make a prediction or a decision in response to an input without being explicitly programmed to do so. One area of application for machine learning is image generation.

For example, a machine learning model can be trained to predict information for an image in response to an input prompt, and to then generate the image based on the predicted information. A machine learning model can be used to generate a composite image, or an image in which a foreground object is composited with a background scene.

SUMMARY

Systems and methods are described for generating a relighted image using a coarse-to-fine relighting framework, where the relighted image depicts an object according to lighting informed by a coarse lighting representation. In one example, the framework uses coarse (e.g., approximate) lighting features to obtain fine-grained (e.g., more precise) lighting features for the object.

For example, a machine learning model of an image generation system generates the coarse lighting representation of the object based on a user input of lighting parameters, and the coarse lighting representation is used as a strong control signal for generating the composite image using a fine-grained relighting process. The coarse-to-fine relighting framework employed by the machine learning model allows the image generation system to efficiently and accurately generate the relighted image including the object with a high degree of user controllability.

Furthermore, the image generation system may generate multiple relighted images as frames of a video, where each of the frames depict the object. The machine learning model may generate the multiple relighted images using temporal consistency features obtained from the frames in a recurrent manner, such that a lighting of the object is consistent among proximate frames of the video. Also, the temporal consistency among the proximate frames may be further increased by optimizing the machine learning model using a loss that encourages the machine learning model to generate similar lighting features for the proximate frames. Finally, the machine learning model may generate a refined image that preserves or retains high-frequency details of the object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The Detailed Description is described with reference to the accompanying figures. Entities represented in the figures are indicative of one or more entities and thus reference is made interchangeably to single or plural forms of the entities in the discussion.

DETAILED DESCRIPTION

Overview

Figure 1:
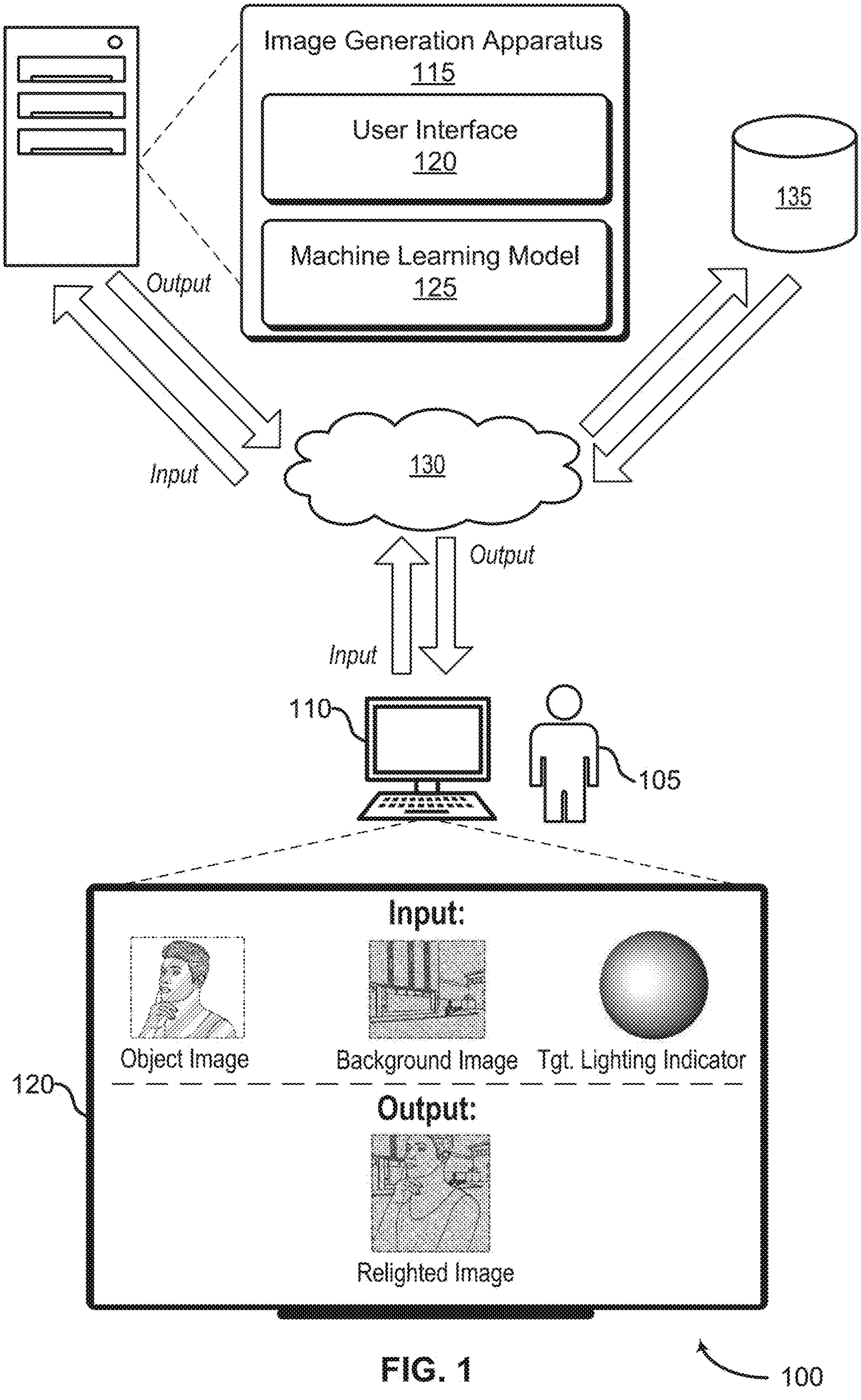
FIG. 1 shows an image generation system in an example implementation that is operable to employ an image generation method to generate a relighted image according to aspects of the present disclosure.

The following relates to image relighting using machine learning. Composite images that depict an isolated object inserted into, onto, or with a background scene may be created using various techniques and methods, including machine learning. Lighting is an important part of how well the object will appear to be visually integrated with the background scene in the composite image. Therefore, conventional image generation systems attempt to relight the object in the composite image in an effort to achieve a harmonious appearance among the object and the background.

However, conventional image generation systems and techniques are inefficient, not scalable, provide inaccurate results, or do not allow for much user control of the lighting of the object in the composite image. For example, some relighting systems require specialized physical infrastructure for capturing images of an object, and/or expensive graphics simulation, which is not scalable or accessible to a general user. Furthermore, these relighting systems are not designed to be generalizable to diverse scenes and arbitrary objects, which also highly limits their usefulness.

Other conventional image generation systems may attempt to use a machine learning model such as a diffusion model to generate a composite image including a relighted object. While more user-accessible than the relighting systems requiring specialized hardware or graphics simulations, conventional diffusion models lack a strong, user-definable lighting control, and therefore output composite images with relatively arbitrary and inaccurate lighting that is not readily controllable by a user.

Accordingly, embodiments of the present disclosure include systems and methods that generate a relighted image depicting an object using a machine learning model, where a lighting of the object in the relighted image is based on target lighting for the relighted image. Specifically, in one example, a lighting estimation model generates a shading map for the object based on the target lighting, and an image generation model generates the relighted image based on the object and the shading map.

By generating the relighted image using the image generation model, embodiments of the present disclosure avoid a need for specialized image-capture hardware or graphics simulation. Because the relighted image is generated based on the shading map, which in turn is generated based on the target lighting, the relighted image includes more accurate and user-controllable object lighting than comparative images generated by conventional diffusion models. Furthermore, the image generation model is generalizable to generate relighted images depicting arbitrary objects.

Generating an output image using a diffusion model based on an input image may cause some fine detail from the input image to be missing from the output image. Accordingly, in one example, a refinement model of the image generation system generates a refined image based on the object and the relighted image, such that fine detail included in the object is retained or preserved in the refined image.

Additionally, some embodiments of the present disclosure include systems and methods that generate a relighted video including two or more relighted images as frames, where the relighted images depict the object. Conventional approaches to generating a video including a relighted object require multi-view reconstruction from a specialized capturing device, which is not scalable or accessible to a general user. Furthermore, conventional diffusion-based approaches lack an ability to produce consistent object lighting across frames of a video, thereby producing a visually unappealing and unrealistic flickering and/or distortion effect.

By contrast, in one example, the image generation model generates an additional relighted image based on temporal consistency information derived from the relighted image using an add-on motion module for temporal lighting regularization, and includes the relighted image and the additional relighted image as consecutive frames in a video. The add-on motion module may be directly combined with an encoder of the image generation model without additional training of the encoder. Because the additional relighted image is generated based on the relighted image, the lighting of the object in the two relighted images is consistent, and a distracting flickering and/or distortion is avoided.

Additionally or alternatively, in another example, a consistency in the lighting of the object in the relighted image and the additional relighted image is increased by optimizing the image generation model using a loss that minimizes a distance of a latent lighting distribution for consecutive frames and maximizes the distance for distant frames. Additionally or alternatively, in another example, the image generation model applies a recurrent blending of subspace lighting features of the relighted image and the additional relighted image to increase the temporal consistency of the relighted video.

An example of the present disclosure is used in a video compositing context. In the example, the user wants to isolate a person depicted in multiple frames of an original video and composite the isolated person into frames of a video that depict a new background scene, and to control the lighting of the person such that the person is realistically depicted against the background scene across the frames of the composite video in a consistent manner.

In the example, the user provides the background scene, target lighting for the person, and object images depicting the person to the image generation system via a user interface provided on a user device by the image generation system.

The image generation system generates a shading map for a first object image using the target lighting, and generates a first relighted image based on the first object image, the shading map, and the background scene. The image generation system similarly generates an additional relighted image for another object image, but also generates the additional relighted image using temporal consistency features generated based on the first relighted image. The image generation system refines each generated relighted image to retain fine details included in the corresponding object images. The image generation system then assembles the refined images in temporal order to obtain the composite video. The image generation system displays the composite video to the user via the user interface.

Figure 2:
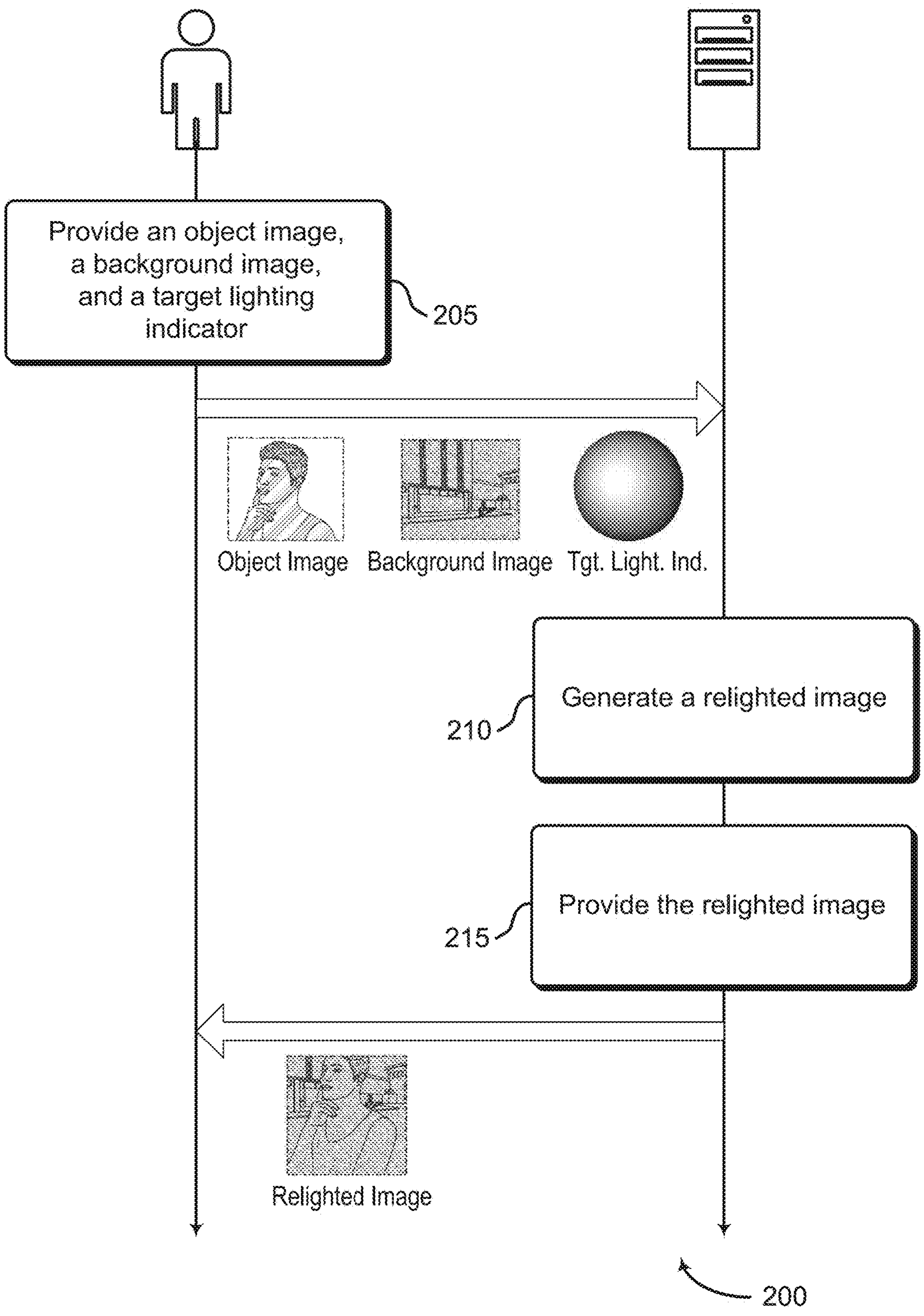
FIG. 2 shows an example of a method for image generation using a relighting method according to aspects of the present disclosure.

Further example applications of the present disclosure in a relighting context are provided with reference to FIGS. 1-2. Details regarding the architecture of the image generation system are provided with reference to FIGS. 1-8 and 16-18. Examples of a process for generating a relighted image are provided with reference to FIGS. 9-11. Examples of a process for training a machine learning model are provided with reference to FIGS. 12-15.

Embodiments of the present disclosure improve upon conventional image generation systems by making a relighted image generation process more efficient, accurate, and user-controllable. For example, some embodiments use an image generation model conditioned on user-provided lighting parameters to generate the relighted image, thereby avoiding using specialized image-capturing equipment or graphics rendering software while providing an image that accurately and realistically depicts a relighted object. Some embodiments achieve this accuracy and user-controllability by generating a shading map for an object based on a user-provided target lighting, and generating the relighted image based on the shading map and the object. Furthermore, some embodiments generate a refined image based on the relighted image to preserve high-frequency details in the refined image.

Furthermore, some embodiments of the present disclosure improve upon conventional image generation systems by making a process of generating multiple related relighted images more accurate. Some embodiments achieve this accuracy by using an image generation model to generate an additional relighted image based on temporal consistency information from a previous relighted image, and/or optimizing the image generation model to maximize a similarity of lighting between a relighted image and an additional relighted image that are intended to be used as consecutive frames of a video.

By contrast, conventional image generation systems generate relighted images using expensive and inaccessible image-capturing hardware or graphical rendering software, or using conventional diffusion models that are not conditioned on a separate, user-controllable target lighting indicator. Furthermore, conventional image generation systems rely on impractical specialized hardware to capture multiple relighted images of one object, or use conventional diffusion models that do not output multiple relighted images having consistent lighting of the object.

Example Image Generation System

FIG. 1 shows an image generation system 100 in an example implementation that is operable to employ an image generation method to generate a relighted image according to aspects of the present disclosure. The example shown includes image generation system 100, user 105, user device 110, image generation apparatus 115, cloud 130, and database 135. Image generation apparatus 115 is an example of, or includes aspects of, the corresponding element described with reference to FIGS. 3-6, 13, and 16-18.

In one aspect, image generation apparatus 115 includes user interface 120 and machine learning model 125. User interface 120 is an example of, or includes aspects of, the corresponding element described with reference to FIG. 16. Machine learning model 125 is an example of, or includes aspects of, the corresponding element described with reference to FIGS. 3-8, 13, and 17-18.

In the example of FIG. 1, user 105 provides an object image, a background image, and a target lighting indicator to image generation apparatus 115 via user interface 120 displayed on user device 110 by image generation apparatus 115. Image generation apparatus 115 uses machine learning model 125 to detect a surface normal map of the object image, generate a shading map based on the surface normal map and the target lighting indicator, and generate a relighted image based on the object image, the background image, and the shading map. Image generation apparatus 115 provides the relighted image to user 105 via user interface 120.

As used herein, an "object image" is an image depicting an object, such as a person, an animal, an item, or any other subject, against a blank background or a single-color (such as white) background. A "background image" refers to an image depicting an intended background of a relighted image. A background image may depict a scene, a combination of colors or shades, or any other setting.

As used herein, a "surface normal map" refers to general local geometry information (e.g., height, depth, shape, etc.) of an object. In some cases, surface normal maps store information about the surface of the object in the form of a texture image. By encoding surface normal in a texture, surface normal maps can simulate the appearance of surface detail, such as bumps, scratches, wrinkles, and more, without adding complexity to geometry below the surface.

As used herein, a "target lighting indicator" refers to information or data that is intended to inform lighting depicted in the relighted image. The target lighting indicator can include a source direction, color, and intensity of lighting. Examples of target lighting indicators include target lighting coefficients and spherical harmonics provided according to spherical harmonic lighting rendering techniques.

As used herein, "lighting" refers to an effect that a light source (either real or imaginary) has on an appearance of an object, such as color changes, brightness changes, shadowing, etc. Light is a key component that determines how an image object such as a person looks in an image or video, including a streaming video or a video conference.

As used herein, a "shading map" refers to a visual representation of lighting intensity on an object. In some cases, the shading map provides spatial context for a lighting source, direction, and intensity with respect to the object.

As used herein, a "relighted image" refers to an image in which the object is depicted using lighting determined based on the target lighting indicator. In some cases, a relighted image is a composite image depicting the object composited with a background image and according to lighting determined based on the target lighting indicator, the background image, or a combination thereof.

According to some aspects, user device 110 is a personal computer, laptop computer, mainframe computer, palmtop computer, personal assistant, mobile device, or any other suitable processing apparatus. User device 110 may include software that displays a user interface (e.g., a graphical user interface) provided by image generation apparatus 115. The user interface allows information (such as images, prompts, etc.) to be communicated between user 105 and image generation apparatus 115.

According to some aspects, a user device user interface enables user 105 to interact with user device 110. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

According to some aspects, image generation apparatus 115 includes a computer-implemented network. In some embodiments, the computer-implemented network includes a machine learning model (such as machine learning model 125, described in further detail with reference to FIGS. 3-8, 13, and 17-18). In some embodiments, machine learning model 125 is an artificial neural network (ANN), such as the guided diffusion model described with reference to FIG. 7 and the U-Net described with reference to FIG. 8.

Image generation apparatus 115 may also include one or more processors, a memory subsystem, a communication interface, an I/O interface, one or more user interface components, and a bus as described with reference to FIG. 16. Additionally, image generation apparatus 115 may communicate with user device 110 and database 135 via cloud 130.

According to some aspects, image generation apparatus 115 is implemented on a server. A server provides one or more functions to users linked by way of one or more of various networks, such as cloud 130. The server may include a microprocessor board that includes a microprocessor responsible for controlling all aspects of the server. The server uses the microprocessor and protocols such as hypertext transfer protocol (HTTP), simple mail transfer protocol (SMTP), file transfer protocol (FTP), and simple network management protocol (SNMP) to exchange data with other devices or users on one or more of the networks. The server may be configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Further detail regarding the architecture of an image generation system is provided with reference to FIGS. 3-8 and 16-18. Further detail regarding an image generation process is provided with reference to FIGS. 2 and 9-11. Further detail regarding a process for training machine learning model 125 is provided with reference to FIGS. 12-15.

Cloud 130 is a computer network configured to provide on-demand availability of computer system resources, such as data storage and computing power. Cloud 130 may provide resources without active management by a user. The term "cloud" is sometimes used to describe data centers available to many users over the Internet. Some large cloud networks have functions distributed over multiple locations from central servers. A server is designated an edge server if the server has a direct or close connection to a user. Cloud 130 may be limited to a single organization or be available to many organizations. In one example, cloud 130 includes a multi-layer communications network comprising multiple edge routers and core routers. In another example, cloud 130 is based on a local collection of switches in a single physical location. According to some aspects, cloud 130 provides communications between user device 110, image generation apparatus 115, and database 135.

Database 135 is an organized collection of data. In an example, database 135 stores data in a specified format known as a schema. According to some aspects, database 135 is structured as a single database, a distributed database, multiple distributed databases, or an emergency backup database. A database controller may manage data storage and processing in database 135. A user may interact with the database controller, or the database controller may operates automatically without interaction from the user. According to some aspects, database 135 is included in image generation apparatus 115. According to some aspects, database 135 is external to image generation apparatus 115 and communicates with image generation apparatus 115 via cloud 130.

FIG. 2 shows an example of a method 200 for image generation using a relighting method according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, an aspect of the present disclosure provides a generalizable and consistent object relighting method using a lighting estimation model and an image generation model by controlling light in a relighted image in a coarse-to-fine manner. Object relighting refers to a generation of an image depicting an object in a different lighting context from a previous lighting context for the object. In some embodiments, an image generation system uses the relighting method to generate a relighted image depicting an object and a background.

In an example, a lighting estimation model (e.g., a coarse lighting module) estimates a pixel-aligned shading map from a surface normal map of the object and an image generation model (e.g., a diffusion model) generates a fine-grained relighted image of the object based on lighting control variables including coarse shading provided by the pixel-aligned shading map and a background image. The shading map allows the image generation model to generate a relighted image including more accurate and user-controllable lighting of the object than conventional image generation systems.

At operation 205, a user provides an object image, a background image, and a target lighting indicator. In some cases, the operations of this step refer to, or may be performed by, a user as described with reference to FIG. 1. In an example, the user provides an image including the object, the background image, and the target lighting indicator to an image generation apparatus (such as the image generation apparatus described with reference to FIG. 1) via a user interface (such as the user interface described with reference to FIG. 1) provided on a user device (such as the user device described with reference to FIG. 1) by the image generation apparatus. The image generation apparatus extracts the object from the image including the object (for example, using a mask provided by the user or generated by the image generation apparatus) to obtain the object image including the object and a blank or white background.

At operation 210, the system generates a relighted image. In some cases, the operations of this step refer to, or may be performed by, an image generation apparatus as described with reference to FIG. 1. For example, the image generation apparatus generates the relighted image based on the object image, the background image, and the target lighting indicator as described with reference to FIGS. 3 and 9.

At operation 215, the system provides the relighted image. In some cases, the operations of this step refer to, or may be performed by, an image generation apparatus as described with reference to FIG. 1. In an example, the image generation apparatus displays the relighted image to the user via the user interface.

Figure 3:
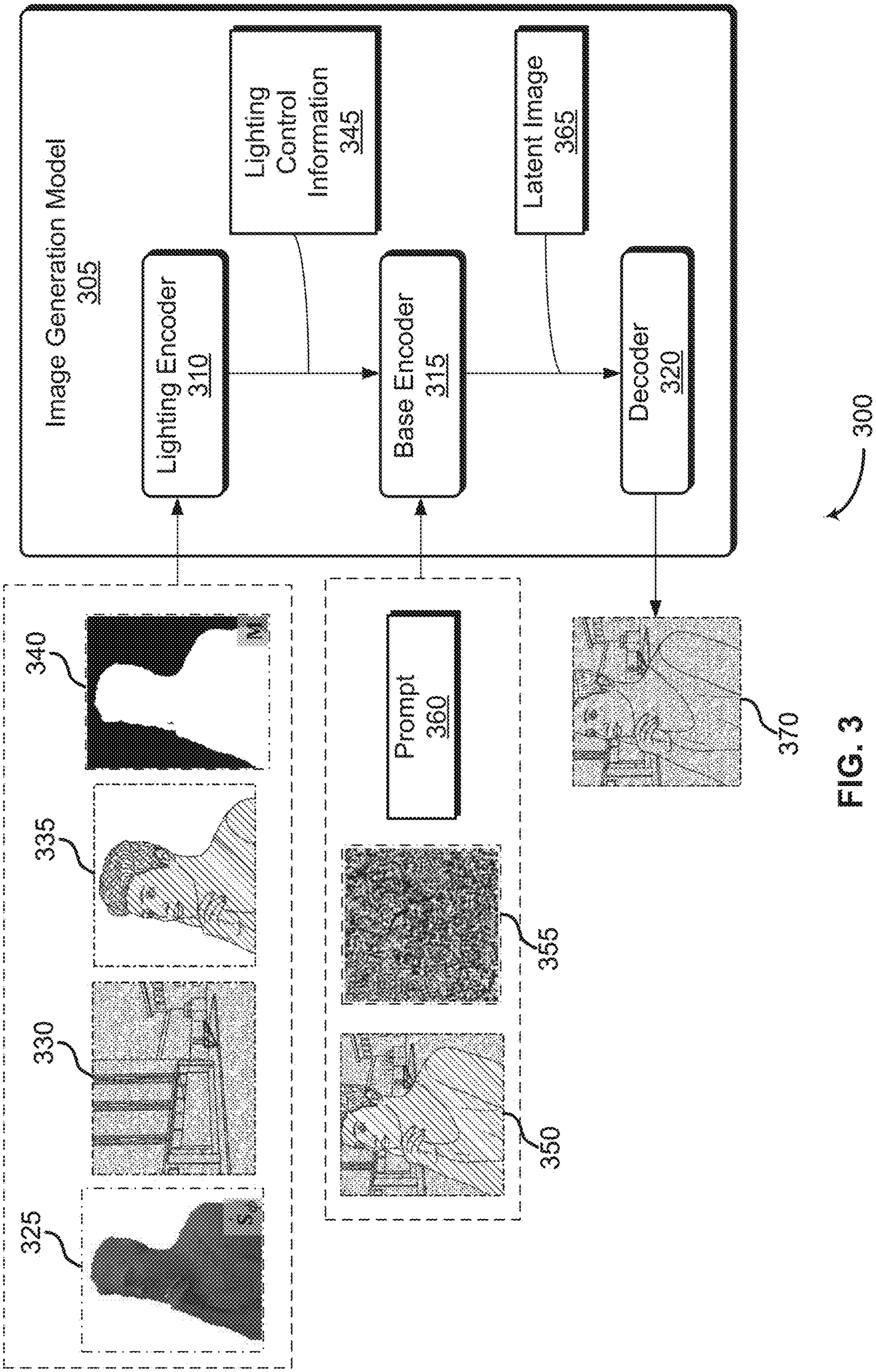
FIG. 3 shows an example implementation of a machine learning model that employs an image generation method to generate a relighted image according to aspects of the present disclosure.

FIG. 3 shows an example implementation of a machine learning model that employs an image generation method to generate a relighted image according to aspects of the present disclosure. The example shown includes image generation apparatus 300, shading map 325, background image 330, object image 335, mask 340, lighting control information 345, preliminary composite image 350, noise map 355, prompt 360, latent image 365, and relighted image 370.

Image generation apparatus 300 is an example of, or includes aspects of, the corresponding element described with reference to FIGS. 1, 4-6, 13, 17, and 18. In one aspect, image generation apparatus 300 includes image generation model 305. Image generation model 305 is an example of, or includes aspects of, the corresponding element described with reference to FIGS. 5, 6, and 18.

In one aspect, image generation model 305 includes lighting encoder 310, base encoder 315, and decoder 320. Lighting encoder 310, base encoder 315, and decoder 320 are examples of, or include aspects of, the corresponding elements described with reference to FIG. 5.

Shading map 325 is an example of, or includes aspects of, the corresponding element described with reference to FIGS. 4, 5, and 13. Background image 330, object image 335, lighting control information 345, noise map 355, prompt 360, and latent image 365 are examples of, or include aspects of, the corresponding elements described with reference to FIG. 5. Mask 340 is an example of, or includes aspects of, the corresponding element described with reference to FIGS. 5 and 13. Preliminary composite image 350 and relighted image 370 are examples of, or include aspects of, the corresponding element described with reference to FIGS. 5 and 6.

According to some aspects, an image generation model such as image generation model 305 generates a fine-grained relighted image of an object (such as a person) controlled by a coarse lighting condition:

$$\varepsilon(I;\phi)=z,\ \mathcal{D}(z)=I_\phi \tag{1}$$

ε is an encoder that generates latent image features $z$ (e.g., latent image 365) as a function of an input image $I\in\mathbb{R}^{w\times h\times 3}$ (e.g., preliminary composite image 350) and global lighting parameters $\phi\in\mathbb{R}^n$ (e.g., spherical harmonics, where n may equal 25) (e.g., target lighting as described herein). Spherical harmonics are functions defined on a surface of a sphere, and spherical harmonics lighting techniques include replacing parts of standard lighting equations with spherical functions that are projected into frequency space using spherical harmonics as a basis. $\mathcal{D}$ is a decoder (e.g., decoder 320) that generates a fine-grained relighted image $I_\phi\in\mathbb{R}^{w\times h\times 3}$ (e.g., relighted image 370) from the latent image features $z$. As the spherical harmonics are an approximated basis that describe an illumination on a surface of a 3D sphere, the latent space of the latent image features $z$ capture a coarse lighting effect.

Because the global lighting parameters ϕ are a global vector representation that is inherently missing a spatial lighting context in the pixel space, the decoder $\mathcal{D}$ may decode a relation between each pixel of the input image I and the global lighting parameters ϕ, which is a highly under-constrained problem that involves significant rendering ambiguity. To suppress such ambiguity, some embodiments use a two-dimensional lighting representation of the global lighting parameters ϕ:

$$\varepsilon(I;S_\phi)=z,\ S_\phi\leftarrow S(\phi) \tag{2}$$

S computes a lighting intensity in a hemisphere space $S_\phi\in\mathbb{R}^{w\times h}$ (as visualized in FIG. 4) by a linear combination of different frequency basis functions defined by the global lighting parameters ϕ. Since the hemisphere space $S_\phi$ provides spatial context for a source, direction, and intensity of a lighting, the decoder $\mathcal{D}$ can capture the local relations between pixels of an image and the lighting.

While the appearance of an object in an image is decided by the interaction of the lighting for the image and a surface of the object (e.g., an appearance of a person's face becomes darker as the incident angle between the lighting direction and the face is larger), such interaction may be missing in the hemisphere space $S_\phi$ due to the unknown object surface, introducing further ambiguity that inhibits the decoder $\mathcal{D}$ from generating physically plausible relighting results. Therefore, aspects of the present disclosure provide a pixel-aligned lighting representation $\dot{S}_\phi$ (e.g., shading map 325) conditioned by an object's local geometry information:

$$\varepsilon(I;\dot{S}_\phi)=z,\ \dot{S}_\phi\leftarrow \mathcal{f}(N;\phi) \tag{3}$$

$N\in\mathbb{R}^{w\times h\times 3}$ represents a surface normal map of an object, and $\mathcal{f}$ is a function that maps the surface normal map N and the global lighting parameters ϕ to the pixel-aligned shading space. The function $\mathcal{f}$ is implemented using a lighting estimation model to obtain the pixel-aligned lighting representation $\dot{S}_\phi$ as described with reference to FIG. 4. Because the pixel-aligned lighting representation $\dot{S}_\phi$ is spatially aligned with the surface of the object, the pixel-aligned lighting representation $\dot{S}_\phi$ can highly suppress the ambiguity arising from both lighting and geometry, allowing the decoder $\mathcal{D}$ to generate a fine-grained image of the relit object (e.g., relighted image 370).

The pixel-aligned lighting representation $\dot{S}_\phi$ describes a lighting intensity and direction, but might not account for a color distribution within a scene. One comparative approach to representing lighting color is to assign different weights on the coarse lighting map, e.g., $$\dot{S}_\phi^{color}=\{w_r\dot{S}_\phi,\ w_g\dot{S}_\phi,\ w_b\dot{S}_\phi\},$$

where w is a weight for each RGB channel. However, representing the lighting color with a single variable may constrain an expressiveness of appearance, which often varies depending on the three-dimensional spatial location of a background scene. Therefore, some aspects of the present disclosure further encode a background image $B^{w\times h\times 3}$ (e.g., background image 330) onto the latent space of the latent image features $\mathcal{D}$ to capture the color distribution of the local lighting:

$$\varepsilon(I;\{\dot{S}_\phi,B\})=z \tag{4}$$

In some cases, because the background image B is encoded onto the latent space of the latent image features $\mathcal{D}$, the decoder $\mathcal{D}$ can perform total relighting in a context of a novel lighting direction, intensity, and color.

According to some aspects, the image generation model implicitly learns intrinsics of objects (e.g., albedo). Albedo is a term used in physics to describe a proportion of light that is reflected by an object. In computer graphics, albedo refers to a base color of an object, before any lighting or shading is applied. An albedo map defines a diffuse color of an object, which is the color that it would appear to have in bright, evenly-distributed light. For example, an object with an albedo map that is entirely white would appear to be a bright, matte white in diffuse light, while an object with an albedo map that is entirely black would appear to be a dark, matte black in diffuse light. In some embodiments, optionally, an explicit detected albedo can be replaced with the input image I under a strong and novel shadow to improve a physical plausibility.

As shown in FIG. 3, an aspect of the present discourse enables fine-grained image relighting using a conditional diffusion model ($\mathcal{D}\circ\varepsilon$), such as the diffusion model described with reference to FIG. 7 (e.g., image generation model 305). Image generation model 305 includes lighting encoder 310, base encoder 315, and decoder 320. In the example of FIG. 3, the encoder ε of Equation 4 is implemented as a composition of lighting encoder 310 and base encoder 315:

$$\varepsilon \rightarrow \varepsilon_b\left(I; \varepsilon_l\left(\{\dot{S}_\phi, B\}\right)\right) = z \quad (5)$$

In the example of FIG. 3, $\varepsilon_l$ (lighting encoder 310) encodes $\{\dot{S}_\phi, B\}$ to obtain lighting control variables (e.g., lighting control information 345) and $\varepsilon_b$ (base encoder 315) encodes the conditional variable I (e.g., preliminary composite image 350), whose visual properties, e.g., semantics and identity, are preserved in the output, along with the controls from $\varepsilon_l$ to obtain the latent image features $\mathcal{D}$ (e.g., latent image 365). The decoder $\mathcal{D}$ (decoder 320) decodes the latent image features $\mathcal{D}$ to obtain the relighted image $I_\phi$ of Equation 1 (e.g., relighted image 370).

In some embodiments, a user provides preliminary composite image 350 to image generation apparatus 300 via a user interface (such as the user interface described with reference to FIG. 1). In some embodiments, image generation apparatus 300 generates preliminary composite image 350 by superimposing an object from object image 335 on background image 330 using mask 340.

In some embodiments, base encoder 315 also encodes one or more of noise map 355 (e.g., a noisy media item as described with reference to FIG. 7) and prompt 360 (e.g., a text prompt as described with reference to FIG. 7), such as "Object under different lighting", to obtain latent image 365.

In some embodiments, lighting encoder 310 imposes a foreground awareness on lighting control information 345 by encoding object image 335 and mask 340:

$$\varepsilon_b\left(I; \varepsilon_l\left(\{\dot{S}_\phi, B\}; M, I_O\right)\right) = z \quad (6)$$

$M \in \{0,1\}^{w \times h}$ is a binary mask (e.g., mask 340) of the foreground (e.g., of object image 335) indicating a location of the object, and $I_O$ is object image 335. In some embodiments, image generation apparatus 300 generates mask 340 based on object image 335 or an image depicting the object of object image 335. In some cases, a user provides mask 340 to image generation apparatus 300.

Figure 4:
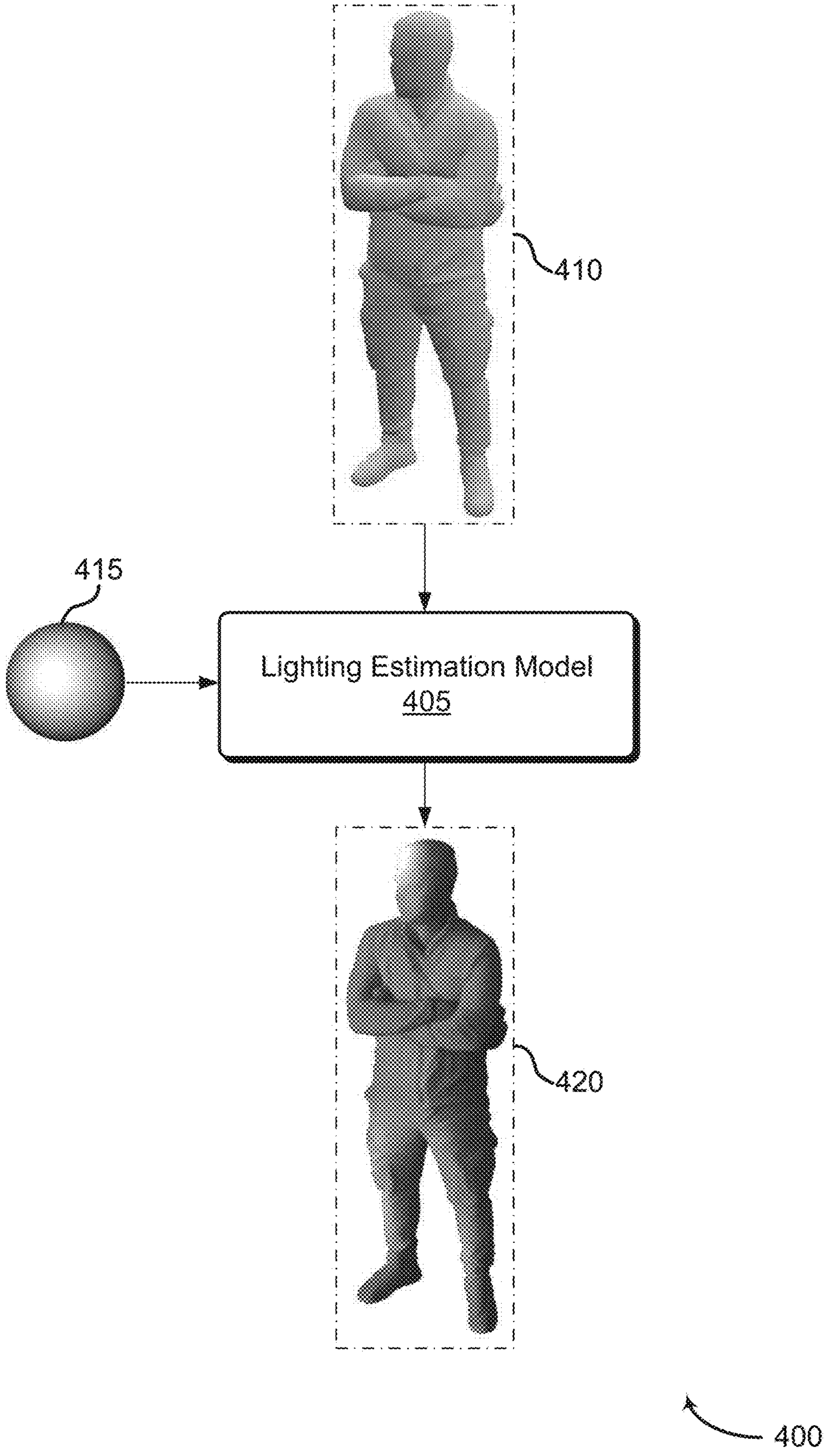
FIG. 4 shows an example implementation of a machine learning model that employs a coarse lighting map estimation method to generate a shading map according to aspects of the present disclosure.

FIG. 4 shows an example implementation of a machine learning model that employs a coarse lighting map estimation method to generate a shading map according to aspects of the present disclosure. The example shown includes image generation apparatus 400, surface normal map 410, target lighting 415, and shading map 420.

Image generation apparatus 400 is an example of, or includes aspects of, the corresponding element described with reference to FIGS. 1, 3, 5, 6, 13, 17, and 18. In one aspect, image generation apparatus 400 includes lighting estimation model 405. Lighting estimation model 405 is an example of, or includes aspects of, the corresponding element described with reference to FIGS. 13 and 18.

Surface normal map 410 and target lighting 415 are examples of, or include aspects of, the corresponding elements described with reference to FIG. 13. Shading map 420 is an example of, or includes aspects of, the corresponding element described with reference to FIGS. 3, 5, and 13.

According to some aspects, the pixel-aligned coarse lighting estimation function $\mathcal{f}$ of Equation 3 is enabled using a conditional U-Net framework (e.g., lighting estimation model 405), such as the U-Net described with reference to FIG. 8. The pixel-aligned lighting estimation function $\mathcal{f}$ takes as inputs or conditions a surface normal map N (e.g., surface normal map 410) and target lighting parameters $\phi$ (e.g., target lighting 415), and estimates the shading $\dot{S}_\phi$ (e.g., shading map 420) at each pixel lit by the target lighting parameters $\phi$.

In some embodiments, a user provides the surface normal map N to image generation apparatus 400 via a user interface (such as the user interface described with reference to FIG. 1). In some embodiments, the surface normal map N is detected from an input image I (e.g., a preliminary composite image or an object image) using an internal normal detector (e.g., a surface normal model as described with reference to FIGS. 13 and 18) comprising a U-Net architecture (such as the U-Net described with reference to FIG. 8) with pyramid vision transformer. In some embodiments, the surface normal model is trained on ground-truth data such that the model is applicable to general scenes and objects. In some embodiments, the pixel-aligned lighting estimation function $\mathcal{f}$ does not take visual data as input and therefore does not introduce visual domain gaps.

Figure 5:
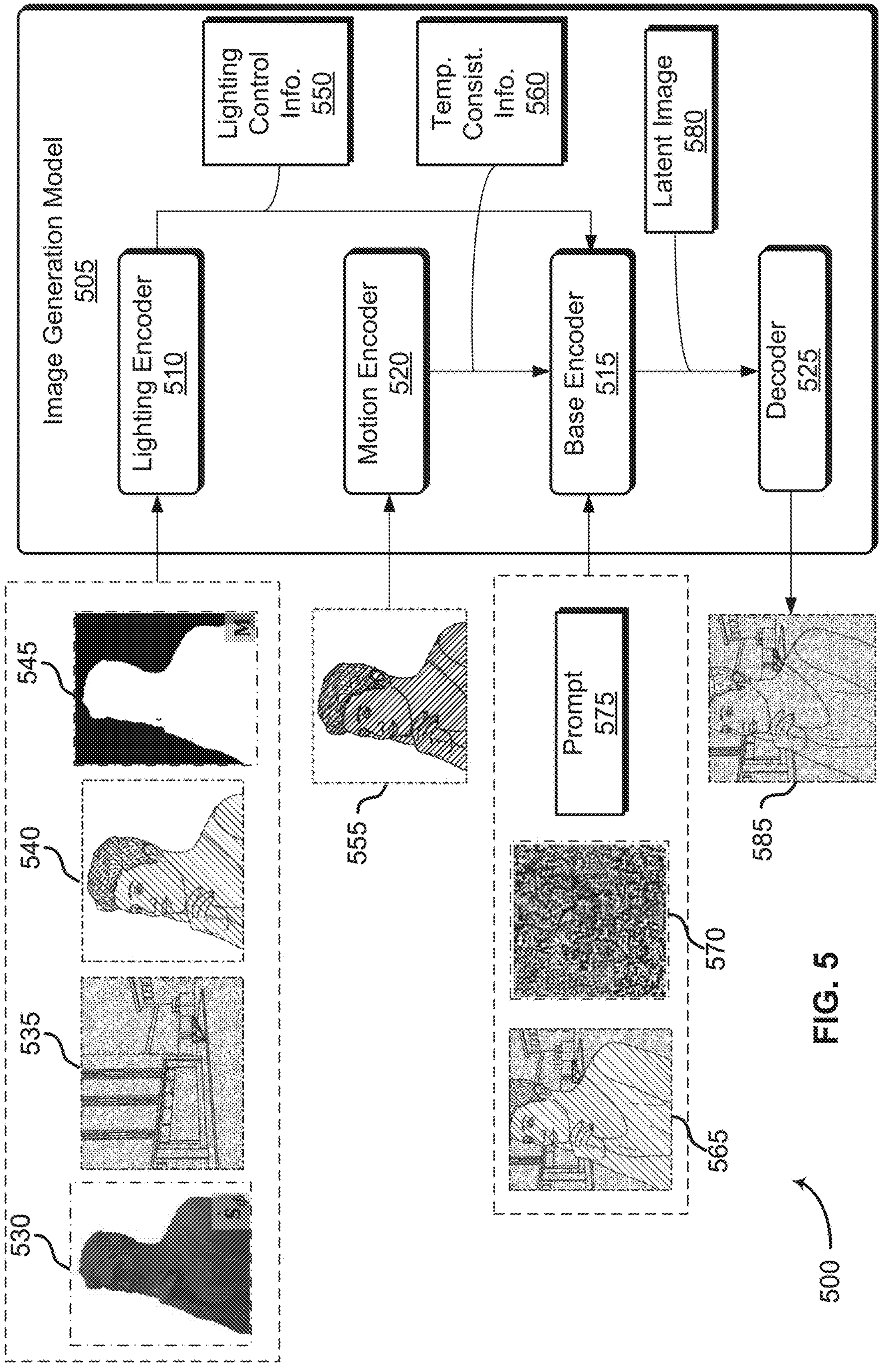
FIG. 5 shows an example implementation of a machine learning model that employs a lighting cycle consistency method to generate a relighted image according to aspects of the present disclosure.

FIG. 5 shows an example implementation of a machine learning model that employs a lighting cycle consistency method to generate a relighted image according to aspects of the present disclosure. The example shown includes image generation apparatus 500, shading map 530, background image 535, object image 540, mask 545, lighting control information 550, previous relighted object image 555, temporal consistency information 560, preliminary composite image 565, noise map 570, prompt 575, latent image 580, and relighted image 582.

Image generation apparatus 500 is an example of, or includes aspects of, the corresponding element described with reference to FIGS. 1, 3, 4, 6, 13, 17, and 18. In one aspect, image generation apparatus 500 includes image generation model 505. Image generation model 505 is an example of, or includes aspects of, the corresponding element described with reference to FIGS. 3, 6, and 18.

In one aspect, image generation model 505 includes lighting encoder 510, base encoder 515, motion encoder 520, and decoder 525. Lighting encoder 510 and base encoder 515 are examples of, or include aspects of, the corresponding elements described with reference to FIGS. 3 and 18. Motion encoder 520 is an example of, or includes aspects of, the corresponding element described with reference to FIG. 18. Decoder 525 is an example of, or includes aspects of, the corresponding element described with reference to FIG. 3.

Shading map 530 is an example of, or includes aspects of, the corresponding element described with reference to FIGS. 3, 4, and 13. Background image 535, object image 540, lighting control information 550, noise map 570, prompt 575, and latent image 580 are examples of, or include aspects of, the corresponding elements described with reference to FIG. 3. Mask 545 is an example of, or includes aspects of, the corresponding element described with reference to FIGS. 3 and 13. Preliminary composite image 565 and relighted image 582 are examples of, or include aspects of, the corresponding elements described with reference to FIGS. 3 and 6.

According to some aspects, the image generation model generates two or more relighted images (e.g., a previous relighted image and relighted image 585) as consecutive frames of a video. The image generation model may model temporal context (e.g., how a point on an object's surface will radiate from a specific viewpoint under continuous pose, view, and illumination changes) for the coarse-to-fine relighting framework ($\mathcal{D} \circ \varepsilon_b \circ \varepsilon_l$) to help avoid temporal artifacts such as flickering by implementing an add-on motion module $\varepsilon_m$ (e.g., motion encoder 520) that can be combined, in inference time, with the relighting framework without extra training, i.e., $\mathcal{D}\circ\varepsilon_b\circ(\varepsilon_l\times\varepsilon_m)$.

According to some aspects, the motion module $\varepsilon_m$ is trained to map an image to a latent lighting distribution having a latent space shared with the relighting models ($\mathcal{D}\circ\varepsilon_b$):

$$\mathcal{D}\left(\varepsilon_b\left(I^f;\varepsilon_m\left(I_\phi^{f-1}\right)\right)\right)=I_{f-1}^f \tag{7}$$

$I^f$ denotes an image I of Equations 1-6 for a frame f of a video (e.g., preliminary composite image 565), $$I_\phi^{f-1}$$

denotes a relighted image generated by image generation model 505 as a previous frame of the video (e.g., a frame immediate preceding the frame f), and $$I_{f-1}^f$$

denotes a relighted image (e.g., relighted image 585) generated as the frame f of the video as a function of $$I_\phi^{f-1}.$$

According to some aspects, given a sequence of input frames (e.g., a sequence including a first preliminary composite image corresponding to a first frame f=1, a second preliminary composite image corresponding to subsequent second frame f=2, etc.), the image generation model implements a coarse-to-fine relighting framework to generate a video comprising relighted images as a corresponding sequence of frames in a recurrent way. In some embodiments, for f=1 of the output video, the image generation model generates a first relighted image without using the motion module $\varepsilon_m$. In some embodiments, for a subsequent frame f=2, the first relighted image is conditioned on the motion module $\varepsilon_m$, and therefore, the generation of the second relighted image is controlled by dual control modules, i.e., $\varepsilon_l$ and $\varepsilon_m$, by blending lighting features of the first relighted image and the second image (e.g., with a ratio such as 0.85:0.15, respectively). In some embodiments, the blended lighting features are recurrently combined with lighting features from the previous frame (e.g., f=1) with a ratio such as 0.5:0.5 to improve a lighting temporal coherence for the relighted image of the next frame.

In the example of FIG. 5, for a frame f of a video, lighting encoder 510 generates lighting control information 550 based on shading map 530, background image 535, object image 540, and mask 545. Motion encoder 520 generates temporal consistency information 560 based on previous relighted object image 555 (e.g., an object image extracted using a mask from a previous relighted image $$I_\phi^{f-1}$$

of the previous frame f−1 or the video). Base encoder 515 generates latent image 580 based on lighting control information 550, temporal consistency information 560, preliminary composite image 565, noise map 570, and prompt 575. Decoder 525 decodes latent image 580 to obtain relighted image 585 as the frame f of the video (e.g., $$I_{f-1}^f).$$

Figure 6:
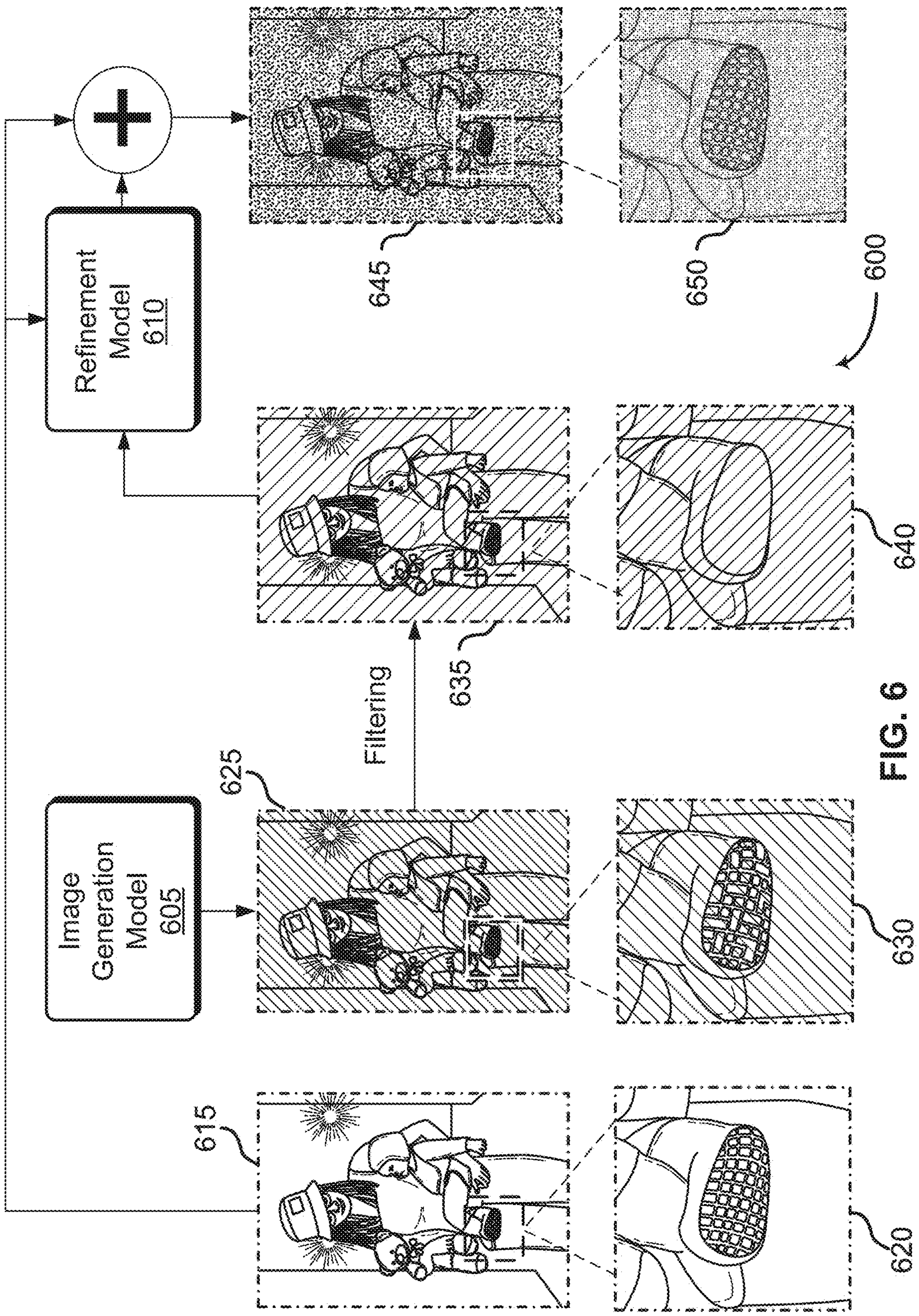
FIG. 6 shows an example implementation of a machine learning model that employs an image generation method to generate a refined image according to aspects of the present disclosure.

FIG. 6 shows an example implementation of a machine learning model that employs an image generation method to generate a refined image according to aspects of the present disclosure. The example shown includes image generation apparatus 600, preliminary composite image 615, relighted image 625, filtered image 635, and refined image 645. Image generation apparatus 600 is an example of, or includes aspects of, the corresponding element described with reference to FIGS. 1, 3-5, 13, 17, and 18.

In one aspect, image generation apparatus 600 includes image generation model 605 and refinement model 610. Image generation model 605 is an example of, or includes aspects of, the corresponding element described with reference to FIGS. 3, 5, and 18.

Refinement model 610 is an example of, or includes aspects of, the corresponding element described with reference to FIG. 18. Preliminary composite image 615 and relighted image 625 are examples of, or include aspects of, the corresponding elements described with reference to FIGS. 3 and 5. In one aspect, preliminary composite image 615 includes preliminary composite image inset 620. In one aspect, relighted image 625 includes relighted image inset 630. In one aspect, filtered image 635 includes filtered image inset 640. In one aspect, refined image 645 includes refined image inset 650.

According to some aspects, a refinement model (such as refinement model 610) generates a refined image (such as refined image 645) based on a relighted image (such as relighted image 625) to preserve or recover high-frequency details (such as portions of an image that change rapidly from adjacent portions) from an original image (such as preliminary composite image 615) that may be omitted or absent in the relighted image.

In some embodiments, the refinement model casts guided refinement as a guided residual prediction to obtain the refined image $$I_\phi^{refine}:$$

$$I_\phi^{refine}=I+g(I_\phi,I;M) \tag{8}$$

$g$ a is a function implemented by the refinement model that predicts a guided lighting residual. The guided lighting residual learns to map a lighting distribution from image I (e.g., a preliminary composite image) to a relighted image $I_\phi$. In some embodiments, $$I_\phi^{refine}$$

effectively preserves high-frequency details of an input image I due to the nature of residual learning, which is designed to preserve visual properties from the observation space, i.e., I.

In some embodiments, because distortion in the relighted image $I_\phi$ may be propagated to the residual, which in turn may make the output distorted, the image generation apparatus extracts low-frequency portions of the relighted image $I_\phi$ using a low-pass (e.g., Gaussian) filter and conditions the filtered image (e.g., filtered image 635) to the prediction function of Equation 8, as lighting distribution is often associated with a low-frequency domain:

$$I_\phi^{refine} = I + g(\mathcal{F}(I_\phi), I; M) \tag{9}$$

$\mathcal{F}$ F is the low-pass filter (e.g., the Gaussian filter). In some embodiments, the predicted residual therefore maps the relighted image $I_\phi$ to the refined image $$I_\phi^{refine}$$

in a decomposed lighting space while preserving high-frequency details from the input image I. According to some aspects, the image generation apparatus refines one or more relighted images generated as frames of a video using the refinement module.

In the example of FIG. 6, image generation apparatus 600 generates relighted image 625 using image generation model 605 and filters relighted image 625 to obtain filtered image 635. Refinement model 610 generates refined image 645 based on preliminary composite image 615 and a combination of preliminary composite image 615 and filtered image 635.

Preliminary composite image inset 620 shows details of a shoe bottom as an example of high-frequency details of preliminary composite image 615. Relighted image inset 630 shows that some of the high-frequency details are not present or are distorted in relighted image 625. Filtered image inset 640 shows that the high-frequency details have been filtered out of filtered image 635. Refined image inset 650 shows that the high-frequency details have been recovered in refined image 645.

Figure 7:
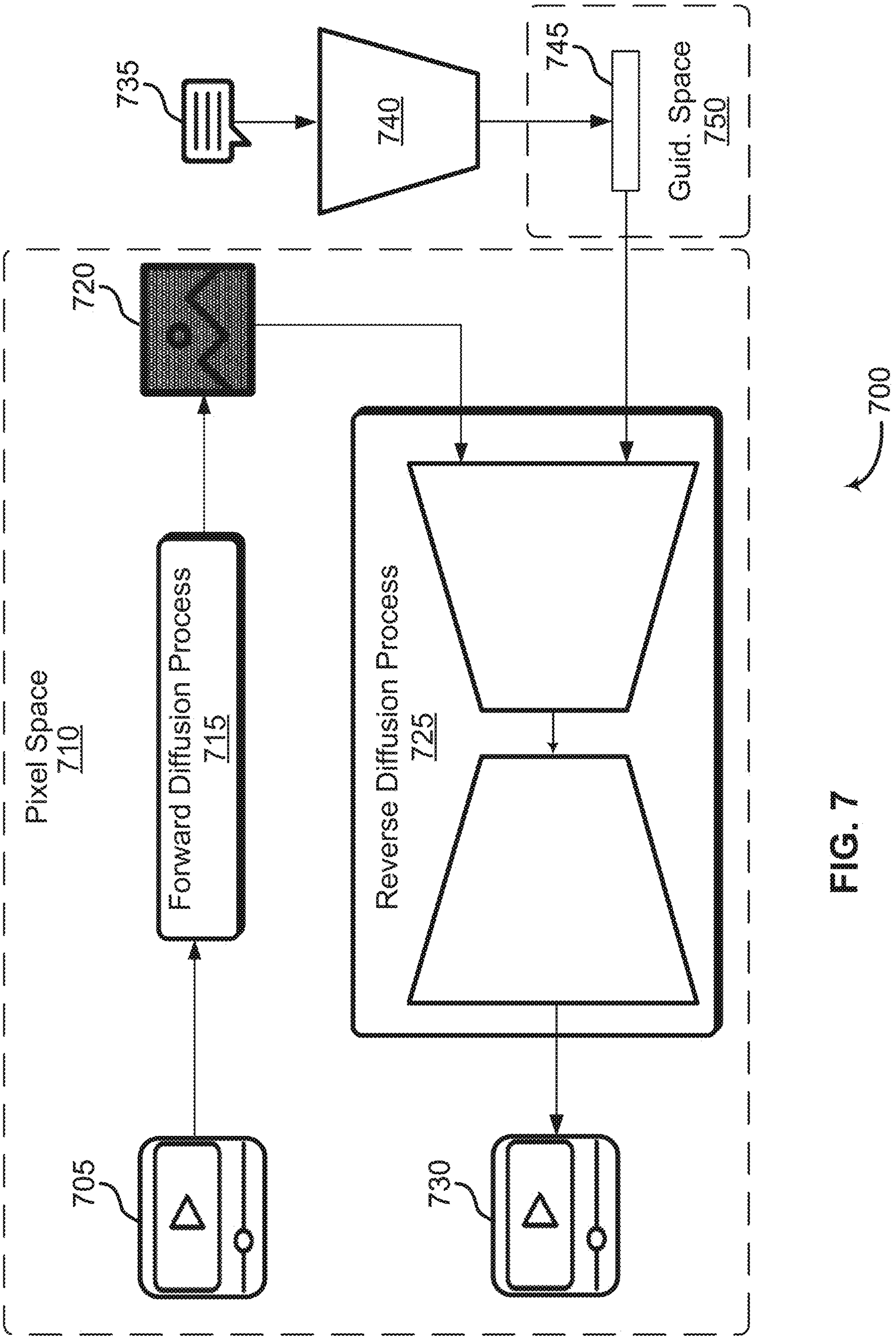
FIG. 7 shows an example of a guided diffusion model according to aspects of the present disclosure.

FIG. 7 shows an example of a guided diffusion model 700 according to aspects of the present disclosure. In some examples, guided diffusion model 700 describes the operation and architecture of the image generation model 1820 described with reference to FIG. 18. The guided diffusion model 700 depicted in FIG. 7 is an example of, or includes aspects of, a media generation model as described herein.

Diffusion models are a class of generative neural networks which can be trained to generate new data with features similar to features found in training data. In particular, diffusion models can be used to generate novel media items such as images, audio files, videos, three-dimensional (3D) models or other digital media items. Diffusion models can be used for various media processing tasks including image super-resolution, generation of media items with perceptual metrics, conditional generation (e.g., generation based on text guidance), image inpainting, and media manipulation.

Diffusion models work by iteratively adding noise to the data during a forward process and then learning to recover the data by denoising the data during a reverse process. For example, during training, guided diffusion model 700 may take an original media item 705 in a pixel space 710 as input and apply forward diffusion process 715 to gradually add noise to the original media item 705 to obtain noisy media item 720 at various noise levels.

Next, a reverse diffusion process 725 (e.g., a U-Net) gradually removes the noise from the noisy media item 720 at the various noise levels to obtain an output media item 730. In some cases, an output media item 730 is created from each of the various noise levels. The output media item 730 can be compared to the original media item 705 to train the reverse diffusion process 725.

The reverse diffusion process 725 can also be guided based on a text prompt 735, or another guidance prompt, such as an image, a layout, a segmentation map, etc. The text prompt 735 can be encoded using a text encoder 765 (e.g., a multimodal encoder) to obtain guidance features 745 in guidance space 750. The guidance features 745 can be combined with the noisy media item 720 at one or more layers of the reverse diffusion process 725 to ensure that the output media item 730 includes content described by the text prompt 735. For example, guidance features 745 can be combined with the noisy features using a cross-attention block within the reverse diffusion process 725.

Methods of operating diffusion models include a Denoising Diffusion Probabilistic Model (DDPM) and a Denoising Diffusion Implicit Models (DDIM). In DDPM, the generative process includes reversing a stochastic Markov diffusion process. DDIMs, on the other hand, use a deterministic process so that the same input results in the same output. In some cases, DDIM can reduce the number of timesteps during media generation. Diffusion models may also be characterized by whether the noise is added to the media item itself, or to media features generated by an encoder (i.e., latent diffusion). In a pixel diffusion model, noise is added and removed in pixel space. In a latent diffusion model, the noise is added (and removed) in a latent space of media features rather than in pixel space. Thus, a latent diffusion model generates media features using reverse diffusion, and these media features can be decoded to obtain a synthetic media item.

Figure 8:
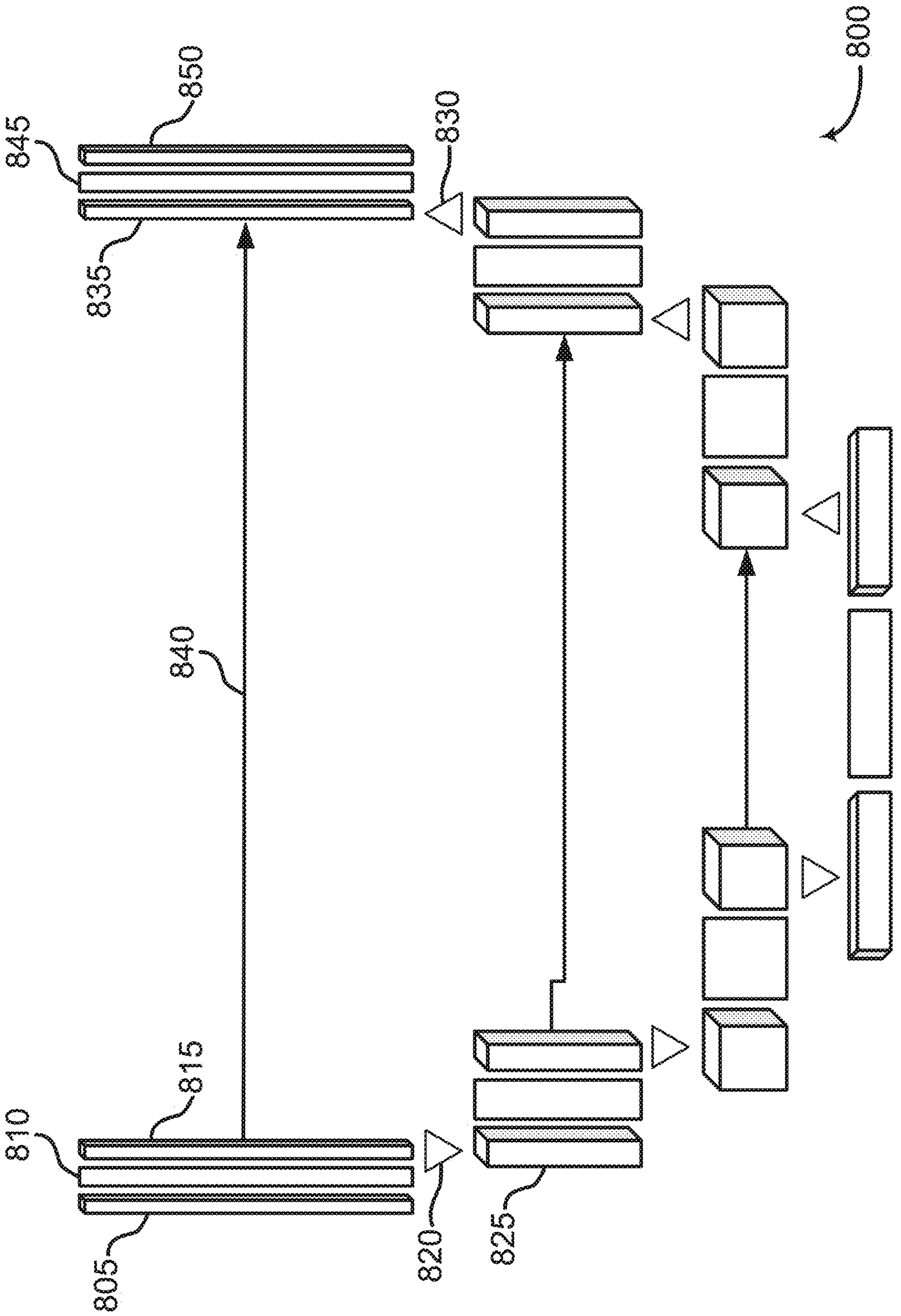
FIG. 8 shows an example of a U-Net according to aspects of the present disclosure.

FIG. 8 shows an example of a U-Net 800 according to aspects of the present disclosure. In some examples, U-Net 800 is an example of the component that performs the reverse diffusion process 725 of guided diffusion model 700 described with reference to FIG. 7 and includes architectural elements of the machine learning model 1715 described with reference to FIG. 17. The U-Net 800 depicted in FIG. 8 is an example of, or includes aspects of, the architecture used within the reverse diffusion process described with reference to FIG. 7.

In some examples, diffusion models are based on a neural network architecture known as a U-Net. The U-Net 800 takes input features 805 having an initial resolution and an initial number of channels and processes the input features 805 using an initial neural network layer 810 (e.g., a convolutional network layer) to produce intermediate features 815. The intermediate features 815 are then down-sampled using a down-sampling layer 820 such that down-sampled features 825 features have a resolution less than the initial resolution and a number of channels greater than the initial number of channels.

This process is repeated multiple times, and then the process is reversed. That is, the down-sampled features 825 are up-sampled using up-sampling process 830 to obtain up-sampled features 835. The up-sampled features 835 can be combined with intermediate features 815 having the same resolution and number of channels via a skip connection 840. These inputs are processed using a final neural network layer 845 to produce output features 850. In some cases, the output features 850 have the same resolution as the initial resolution and the same number of channels as the initial number of channels.

In some cases, U-Net 800 takes additional input features to produce conditionally generated output. For example, the additional input features could include a vector representation of an input prompt. The additional input features can be combined with the intermediate features 815 within the neural network at one or more layers. For example, a cross-attention module can be used to combine the additional input features and the intermediate features 815.

Image Generation

Figure 9:
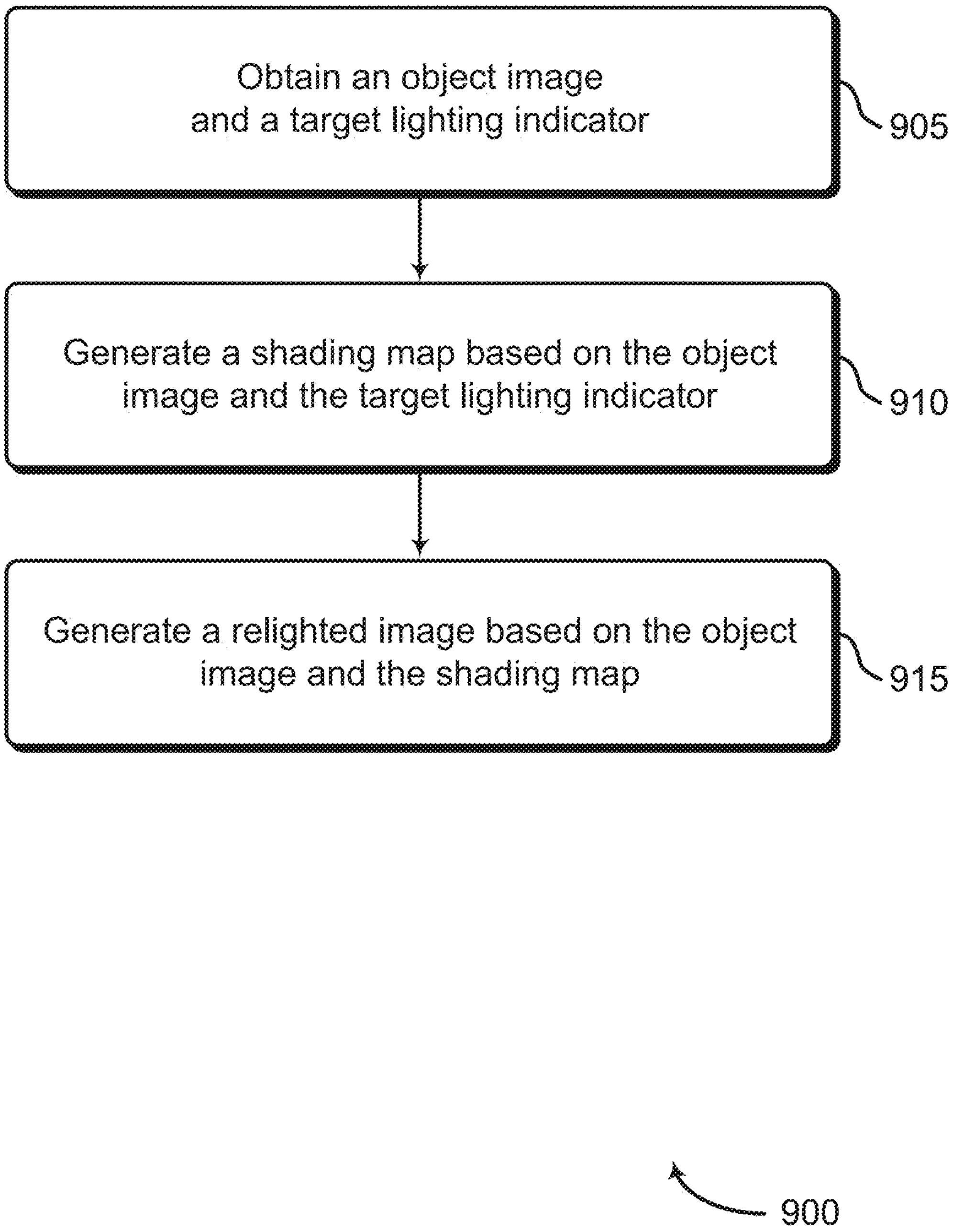
FIG. 9 shows an example of a method for generating a relighted image according to aspects of the present disclosure.

FIG. 9 shows an example of a method 900 for generating a relighted image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

An aspect of the present disclosure provides a generalizable and consistent object relighting method using a lighting estimation model and an image generation model by controlling light in a relighted image in a coarse-to-fine manner. Object relighting refers to a generation of an image depicting an object in a different lighting context from a previous lighting context for the object. In some embodiments, an image generation system uses the relighting method to generate a relighted image depicting an object and a background.

In an example, a lighting estimation model (e.g., a coarse lighting module) estimates a pixel-aligned shading map from a surface normal map of the object and an image generation model (e.g., a diffusion model) generates a fine-grained relighted image of the object based on lighting control variables including coarse shading provided by the pixel-aligned shading map and a background image. The shading map allows the image generation model to generate a relighted image including more accurate and user-controllable lighting of the object than conventional image generation systems.

Furthermore, in some embodiments, the image generation model includes a motion encoder (e.g., a motion module) that learns from videos to regularize a temporal lighting smoothness between frames of a generated video. The image generation model can therefore generate multiple relighted images as frames of a video, where the multiple relighted images include consistent lighting with one another. The image generation model may generate the relighted images in a recurrent manner with temporal feature blending.

Finally, in some embodiments, a refinement model constructs an enhanced image (e.g., a refined image) that fully preserves original high-frequency details from an input image while retaining a predicted lighting distribution of the relighted image.

At operation 905, the system obtains an object image and a target lighting indicator. In some cases, the operations of this step refer to, or may be performed by, a user interface as described with reference to FIG. 1.

In an example, a user (such as the user described with reference to FIG. 1) provides the object image and the target lighting indicator to an image generation apparatus (such as the image generation apparatus described with reference to FIG. 1) via a user interface provided by the image generation apparatus on a user device (such as the user device described with reference to FIG. 1). The object image is an example of the object image described with reference to FIGS. 1-3 and 5-6. In some examples, the user interface also obtains a background image (e.g., provided by a user). The background image is an example of the background image described with reference to FIGS. 1-3 and 5.

The target lighting indicator is an example of the target lighting indicator described with reference to FIG. 4. The target lighting indicator may be information or data that is intended to inform lighting depicted in the relighted image. The target lighting indicator can include values that indicate a source direction, color, and intensity of lighting. In some embodiments, the target lighting indicator comprises spherical harmonics that can be rendered according to spherical harmonic lighting rendering techniques.

At operation 910, the system generates, using a lighting estimation model, a shading map based on the object image and the target lighting indicator. In some cases, the operations of this step refer to, or may be performed by, a lighting estimation model as described with reference to FIGS. 4, 13, and 18. In an example, the lighting estimation model generates the shading map based on the object image and the target lighting indicator as described with reference to FIG. 4.

In some embodiments, the lighting estimation model generates the shading map based on a surface normal map obtained from the object image and the target lighting indicator. In some cases, a surface normal model (such as the surface normal model described with reference to FIGS. 13 and 18) generates the surface normal map based on the object image.

At operation 915, the system generates, using an image generation model, a relighted image based on the object image and the shading map, where the relighted image depicts an object from the object image with lighting based on the target lighting indicator. In some cases, the operations of this step refer to, or may be performed by, an image generation model as described with reference to FIGS. 3, 5, 6, and 18. In an example, the image generation model generates the relighted image on the object image and the shading map as described with reference to FIG. 3.

The lighting of the relighted image may include lighting that has a source direction, color, or intensity based on the target lighting indicator. The lighting may also depend on the background information. For example, the relighted image may include lighted areas and shadows that are based on the lighting from the target lighting indicator and objects in the background image.

According to some aspects, the image generation model generates the relighted image using a diffusion process described with reference to FIGS. 10 and/or 11. In an example, generating the relighted image comprises obtaining a noise map (such as the noise map described with reference to FIGS. 3, 5, 7, and 11), encoding the shading map (and optionally the background image) to obtain lighting control information, and denoising the noise map based on the lighting control information.

In some embodiments, the image generation model obtains a mask indicating a location of the object (e.g., a mask as described with reference to FIGS. 3 and 5) and generates the relighted image based on the mask (e.g., using encoded features of the mask as guidance features for denoising the map). In some embodiments, the image generation model obtains an input prompt describing the relighted image (such as a text prompt or an image prompt) and generates the relighted image based on the input prompt (e.g., using encoded features of the input prompt as guidance features for denoising the noise map).

According to some aspects, the image generation model generates temporal consistency information based on the relighted image and generates an additional relighted image based on the temporal consistency information, where the relighted image and the additional relighted image comprises consecutive frames of a video. In an example, the image generation model generates the relighted image and the additional relighted image as described with reference to FIG. 5 using the diffusion process described with reference to FIGS. 10 and/or 11, where previous relighted object image 555 of FIG. 5 is extracted from the relighted image, and relighted image 585 of FIG. 5 is the additional relighted image.

According to some aspects, generating the relighted image comprises generating a preliminary relighted image (e.g., using the diffusion process described with reference to FIGS. 10 and/or 11) and generating, using a refinement model such as the refinement model described with reference to FIGS. 6 and 18, a refined image based on the object image and the preliminary relighted image, where the refined image includes a detail from the object image that is absent from the preliminary relighted image.

In an example, the refinement model generates the refined image as described with reference to FIG. 6, where preliminary composite image 615 is generated based on the object image, relighted image 625 is the preliminary relighted image, refined image 645 is the refined image, and a comparison of preliminary composite image inset 620, relighted image inset 630, and refined image inset 650 shows high-frequency shoe-bottom detail that is present in preliminary composite image inset 620 and refined image inset 650 and is absent from relighted image inset 630.

According to some aspects, the image generation systems provides one or more of the relighted image, the refined image, the additional relighted image, or a video including the relighted image and the additional relighted image to the user via the user interface.

Figure 10:
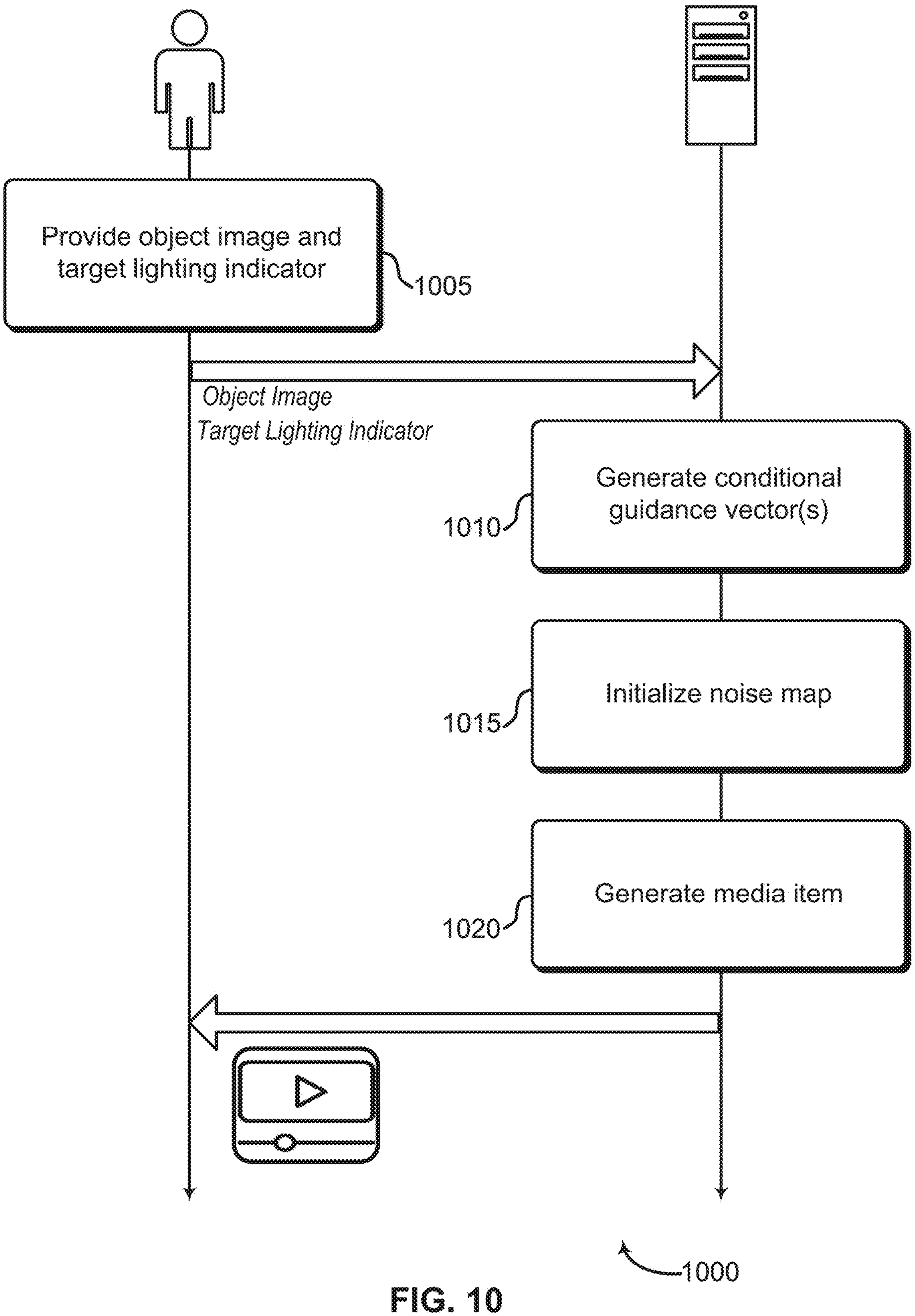
FIG. 10 shows an example of a method for conditional media generation according to aspects of the present disclosure.

FIG. 10 shows an example of a method 1000 for conditional media generation according to aspects of the present disclosure. In some examples, method 1000 describes an operation of the image generation model described with reference to FIGS. 3, 5, 6, and 18 such as an application of the guided diffusion model 700 described with reference to FIG. 7. In some examples, these operations are performed by a system including a processor executing a set of codes to control functional elements of an apparatus such as the media generation model described in FIG. 7.

Additionally or alternatively, steps of the method 1000 may be performed using special-purpose hardware. Generally, these operations are performed according to the methods and processes described in accordance with aspects of the present disclosure. In some cases, the operations described herein are composed of various substeps, or are performed in conjunction with other operations.

In the example of FIG. 10, an image generation system including the image generation model generates a media item (e.g., a relighted image) using a guided reverse diffusion process (such as the reverse diffusion process described with reference to FIG. 11).

At operation 1005, a user provides an object image and a target lighting indicator for content to be included in a generated media item. For example, the user may provide the object image and the target lighting indicator as described with reference to FIG. 9. In some embodiments, the user also provides one or more of a background image, a mask, and a text prompt as described with reference to FIG. 9.

At operation 1010, the system converts the object image and the target lighting indicator into a conditional guidance vector or other multi-dimensional representation. In an example, a lighting encoder generates lighting control information based on the target lighting indicator and the object image as described with reference to FIG. 3.

At operation 1015, a noise map is initialized that includes random noise. The noise map may be in a pixel space or a latent space. By initializing a media item with random noise, different variations of a media item including the content described by the conditional guidance can be generated. In an example, the noise map is initialized using a forward diffusion process described with reference to FIG. 11.

At operation 1020, the system generates a media item based on the noise map and the conditional guidance vector. For example, the media item may be generated using a reverse diffusion process as described with reference to FIG. 11. In an example, a base encoder generates a latent image based on the lighting control information, the noise map, a preliminary composite image, and the prompt, and generates the relighted image based on the latent image as described with reference to FIG. 3.

Figure 11:
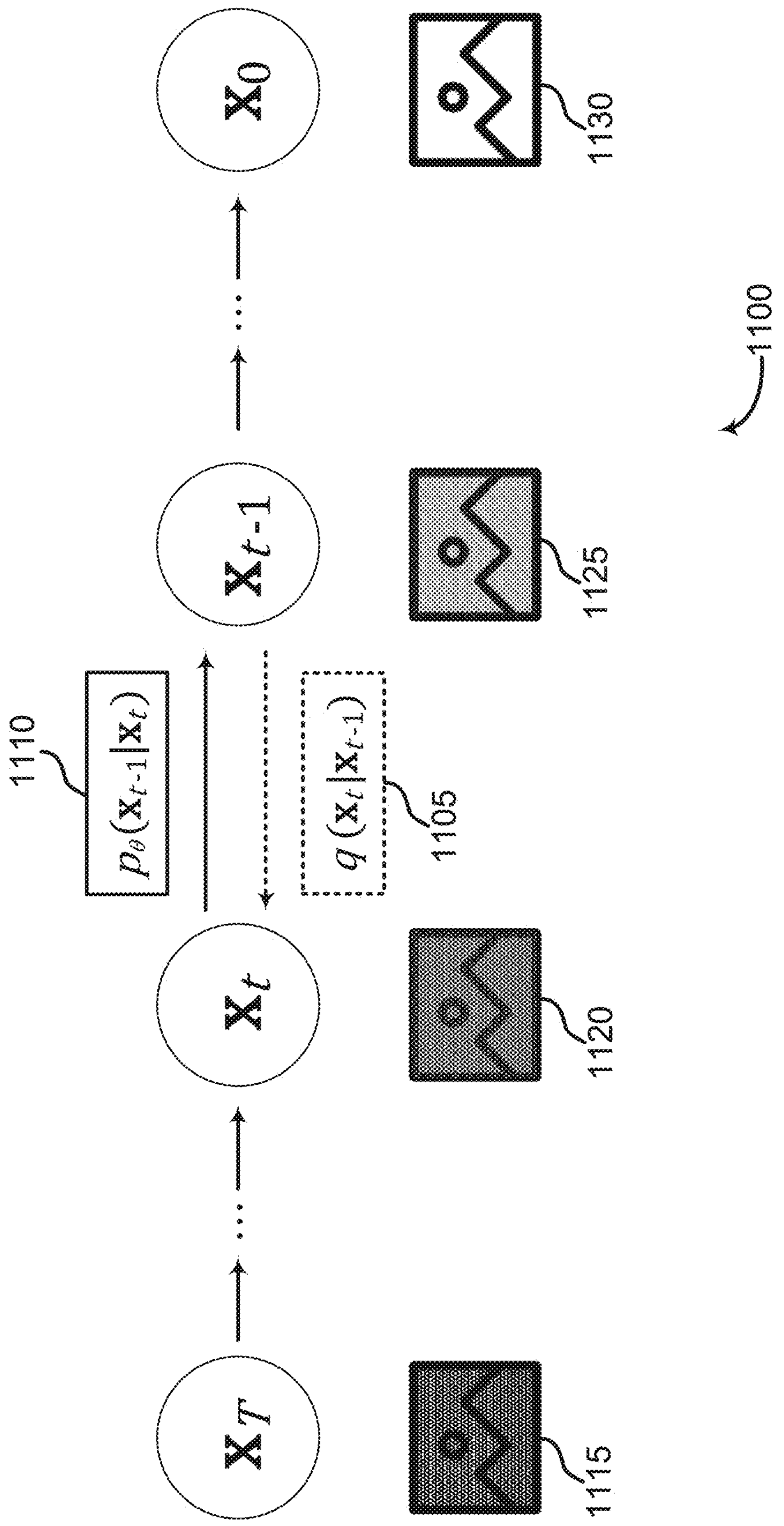
FIG. 11 shows an example of a diffusion process according to aspects of the present disclosure.

FIG. 11 shows an example of a diffusion process 1100 according to aspects of the present disclosure. In some examples, diffusion process 1100 describes an operation of the image generation model 1820 described with reference to FIG. 18, such as the reverse diffusion process 725 of guided diffusion model 700 described with reference to FIG. 7.

As described above with reference to FIG. 7, using a diffusion model can involve both a forward diffusion process 1105 for adding noise to a media item (or features in a latent space) and a reverse diffusion process 1110 for denoising the media item (or features) to obtain a denoised media item. The forward diffusion process 1105 can be represented as $q(x_t|x_{t-1})$, and the reverse diffusion process 1110 can be represented as $p(x_{t-1}|x_t)$. In some cases, the forward diffusion process 1105 is used during training to generate media items with successively greater noise, and a neural network is trained to perform the reverse diffusion process 1110 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 1110, the model begins with noisy data $x_T$, such as a noisy media item 1115 and denoises the data to obtain the $p(x_{t-1}|x_t)$. At each step t−1, the reverse diffusion process 1110 takes $x_t$, such as first intermediate media item 1120, and t as input. Here, t represents a step in the sequence of transitions associated with different noise levels. The reverse diffusion process 1110 outputs $x_{t-1}$, such as second intermediate media item

1125, iteratively until $x_T$ reverts back to $x_0$, the original media item 1130. The reverse process can be represented as:

$$p_\theta(x_{t-1} \mid x_t) := N\left(x_{t-1}; \mu_\theta(x_t, t), \sum\nolimits_\theta(x_t, t)\right). \tag{10}$$

The joint probability of a sequence of samples in the Markov chain can be written as a product of conditionals and the marginal probability:

$$x_T: p_\theta(x_{0\tau}) := p(x_T)\prod\nolimits_{f=1}^{T} p_\theta(x_{t-1} \mid x_t), \tag{11}$$

where $p(x_T)=N(x_T;0,I)$ is the pure noise distribution as the reverse process takes the outcome of the forward process, a sample of pure noise, as input and $$\prod\nolimits_{t=1}^{T} p_\theta(x_{t-1} \mid x_t)$$

represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input media item with low quality, latent variables $x_1, \ldots, x_T$ represent noisy media items, and x represents the generated item with high quality.

Accordingly, a method for image generation is described. One or more aspects of the method include obtaining an object image and a target lighting indicator; generating, using a lighting estimation model, a shading map based on the object image and the target lighting indicator; and generating, using an image generation model, a relighted image based on the object image and the shading map, wherein the relighted image depicts an object from the object image with lighting based on the target lighting indicator.

Some examples of the method further include detecting a surface normal map of the object image, wherein the shading map is based on the surface normal map. Some examples of the method further include obtaining a noise map. Some examples further include encoding the shading map and the background image to obtain lighting control information. Some examples further include denoising the noise map based on the lighting control information.

Some examples of the method further include obtaining a mask indicating a location of the object, wherein the relighted image is generated based on the mask. Some examples of the method further include obtaining an input prompt describing the relighted image, wherein the relighted image is generated based on the input prompt.

Some examples of the method further include generating temporal consistency information based on the relighted image. Some examples further include generating an additional relighted image based on the temporal consistency information, wherein the relighted image and the additional relighted image comprise consecutive frames of a video.

Some examples of the method further include generating a preliminary relighted image. Some examples further include generating a refined image based on the object image and the preliminary relighted image, wherein the refined image includes a detail from the object image that is absent from the preliminary relighted image.

Some examples of the method further include obtaining a background image, wherein the relighted image depicts the object from the object image in a scene from the background image, and wherein the lighting in the relighted image is based at least in part on the background image.

Training

Figure 12:
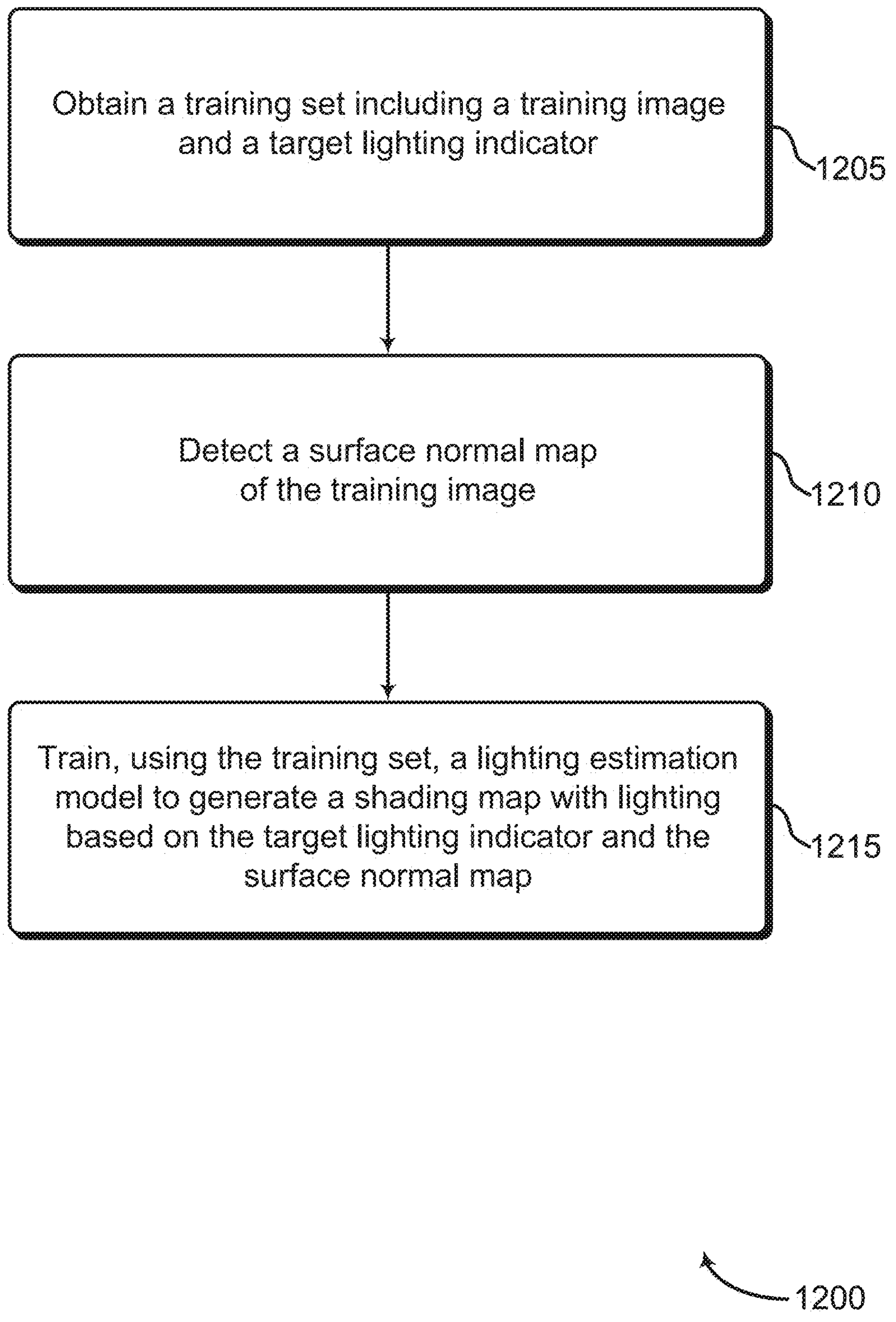
FIG. 12 shows an example of a method for training a lighting estimation model of a machine learning model according to aspects of the present disclosure.

Methods for training a machine learning model, such as the machine learning model described with reference to FIG. 1, are described with reference to FIGS. 12-15. FIG. 12 shows an example of a method 1200 for training a lighting estimation model of a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to some aspects, an image generation system trains a lighting estimation model to provide a shading map for an input image. The shading map allows an image generation model to generate a more consistent, accurate, and user-controllable relighted image than conventional image generation systems. Furthermore, in some embodiments, the image generation model is trained to generate a relighted image based on a ground-truth relighted image and/or a ground-truth relighted albedo map, further increasing a consistency and accuracy of the relighted image.

Additionally, in some embodiments, a motion encoder of the image generation model is trained to provide temporal consistency information that allows the image generation model to increase a temporal consistency quality of relighting results among relighted images generated as frames of a video. Additionally, in some embodiments, the image generation system performs further feature-space temporal optimization using an unsupervised contrastive loss to further increase the temporal consistency quality of relighting results among relighted images generated as frames of a video. Finally, in some embodiments, a refinement model is trained to generate a refined image based on a relighted image, where the refined image preserves or recovers high-frequency details from an original object image that may been lost in the relighted image.

At operation 1205, the system obtains a training set including a training image and a target lighting indicator. In some cases, the operations of this step refer to, or may be performed by, a training component as described with reference to FIG. 17. In an example, the training component retrieves the training set from a database (such as the database described with reference to FIG. 1). Examples of the training image and the target lighting indicator are the training image 1315 and the target lighting 1330 described with reference to FIG. 13. According to some aspects, the training set includes one or more of a ground-truth relighted image, a video, a ground-truth albedo map, a training composite image, a background image, a mask, and a target lighting indicator. In some embodiments, the ground-truth albedo map, the training composite image, the background image, the mask, and the target lighting indicator may be pre-computed.

At operation 1210, the system detects a surface normal map of the training image. In some cases, the operations of this step refer to, or may be performed by, a surface normal model as described with reference to FIGS. 13 and 18. In an example, the surface normal model detects the surface normal map of the object depicted in the training image as described with reference to FIG. 13.

At operation 1215, the system trains, using the training set, a lighting estimation model, to generate a shading map with lighting based on the target lighting indicator and the surface normal map. In some cases, the operations of this step refer to, or may be performed by, a training component as described with reference to FIG. 17.

In an example, training the lighting estimation model includes generating an output image based on the surface normal map and the target lighting indicator, computing a reconstruction loss based on the output image and the training image, and updating parameters of the lighting estimation model based on the reconstruction loss. In some embodiments, the lighting estimation model generates the output image as described with reference to FIG. 13. In some embodiments, the training component computes the reconstruction loss as described with reference to FIG. 13. In some embodiments, the training component updates the parameters of the lighting estimation model based on one or more of the reconstruction loss, a perceptual loss determined as described with reference to FIG. 13, and an adversarial loss determined as described with reference to FIG. 13, as described with reference to FIG. 14.

According to some aspects, the training component trains an image generation model (such as the image generation model described with reference to FIG. 18) to generate a relighted image based on the shading map. In an example, the training component trains the image generation model to generate the relighted image as described with reference to FIG. 15.

According to some aspects, the training component trains a motion encoder (such as the motion encoder described with reference to FIG. 18) to generate temporal consistency information based on the relighted image, where the image generation model uses the temporal consistency information to generate temporally consistent image frames.

The motion module $\varepsilon_m$ of Equation 7 (e.g., the motion encoder) might not be trainable with a conventional loss (e.g., a mean squared error) due to a lack of ground-truth video relighting data for dynamic objects. Accordingly, in some embodiments, the training component trains the motion module $\varepsilon_m$ using real videos with a novel lighting cycle consistency:

$$\mathcal{D}*\left(\mathcal{E}_b^*\left(I^f;\mathcal{E}_c^*\left(\mathcal{E}_l^*\{S_\phi^f, B^f\}; I^f, M^f\right)\right)\right) = I_\phi^f \tag{12}$$

$$\mathcal{D}*\left(\mathcal{E}_b^*\left(I_\phi^f;\mathcal{E}_m\left(I^{f-1}, M^{f-1}\right)\right)\right) = \tilde{I}_{f-1}^f \tag{13}$$

$$\therefore I^f = \tilde{I}_{f-1}^f$$

* indicates a weight freeze during training. Equation 12 represents forward image relighting, i.e., $$I^f \to I_\phi^f,$$

where the image generation model generates the relighted image at frame f. Equation 13 reverts the relighted image, i.e., $$\tilde{I}_{f-1}^f \leftarrow I_\phi^f,$$

to the original image in the context of the previous relighted image (e.g., the preliminary composite image) through the motion module $\varepsilon_m$, where the mask M is used for foreground awareness. Finally, the motion module $\varepsilon_m$ learns the lighting cycle consistency via a lighting cycle consistency loss $\mathcal{L}_{cycle}$:

$$\mathcal{L}_{cycle} = \sum_i \left\| \tilde{I}_{f-1}^f - I^f \right\|_2^2 \tag{14}$$

According to some aspects, the training component randomly samples spherical harmonics lighting parameters from ground-truth data to obtain cyclic relighting data. According to some aspects, the training component updates the parameters of the motion encoder using the lighting cycle consistency loss $\mathcal{L}_{cycle}$, for example as described with reference to FIG. 14.

According to some aspects, the training component computes a noise contrastive estimation loss that optimizes a latent space for temporally related image frames, where the image generation model is trained based on the noise contrastive estimation loss. For example, given that images that have similar visual distribution (e.g., a relighted image and an additional relighted image generated as consecutive frames of a video) will share a close latent space, the latent space may be optimized during a denoising process (such as the reverse diffusion process described with reference to FIG. 15) to ensure the latent features for nearby frames of the video are close to each other while being distinguished from those of frames of the video that are distant from each other by applying an InfoNCE loss, where NCE stands for Noise-Contrastive Estimation, to the denoised latent feature space:

$$\mathcal{L}_{NCE} = -\log\left[\frac{\exp\left(z \cdot z^+/\tau\right)}{\left(z \cdot z^+/\tau\right) + \sum_{n=1}^{N}\left(z \cdot z_n^-/\tau\right)}\right] \tag{15}$$

$\mathcal{D}^+$ is the positive feature samples constructed from temporally nearby frames (e.g., a frame at f−1 or f+1 for a frame f), $\mathcal{D}^-$ is the negative from distant frames, and $\tau$ (e.g., $\tau$=0.07) is a temperature parameter. In some embodiments, the training component trains the lighting control module $\varepsilon_l$ introduced in Equation 5 (e.g., a lighting encoder 1825 described with reference to FIG. 18) to minimize $\mathcal{L}_{NCE}$ to improve a spatial and temporal structure of the lighting latent space with a small number of iterations (e.g., one epoch). In some embodiments, the training component freezes the other components of the image generation model while training the lighting control module $\varepsilon_l$ using $\mathcal{L}_{NCE}$, for example as described with reference to FIG. 14.

According to some aspects, the training component computes a refinement adversarial loss $$\mathcal{L}_{cGAN}^{refine}$$

using the refinement model as a generator G of a conditional generative adversarial network (cGAN) and a discriminator network (such as the discriminator network 1855 described with reference to FIG. 18) as a discriminator D of the cGAN. cGANs learn a conditional generative model by learning a loss that tries to classify if an output image is real or fake, while simultaneously training a generative model (e.g., the refinement model) to minimize the loss by generating outputs that cannot be distinguished from "real" outputs by the discriminator:

$$\mathcal{L}_{cGAN}^{refine} = (G, D) = \mathbb{E}_{x,y}[\log D(x, y)] + \mathbb{E}_{x,z}[\log(1 - D(x, G(x, z))] \quad (16)$$

The training component trains G to minimize the refinement adversarial loss $$\mathcal{L}_{cGAN}^{refine}$$

against the adversarial D that tries to maximize it, i.e., $G^*=\arg\min_G\max_D$ $$\mathcal{L}_{cGAN}^{refine}$$

(G, D). In Equation 16, $y=\{I_{\phi,GT}, I\}$ is the "real" condition, $$x = \{I_{\phi}^{refine}, I\}$$

is the "take" condition, and z is a random noise vector, where I is the input image of Equation 9, $$I_{\phi}^{refine}$$

is the refined image of Equation 9, and $I_{\phi,GT}$ is a ground-truth relighted image. According to some aspects, the training component updates parameters of the refinement model using the refinement adversarial loss $$\mathcal{L}_{cGAN}^{refine}.$$

Figure 13:
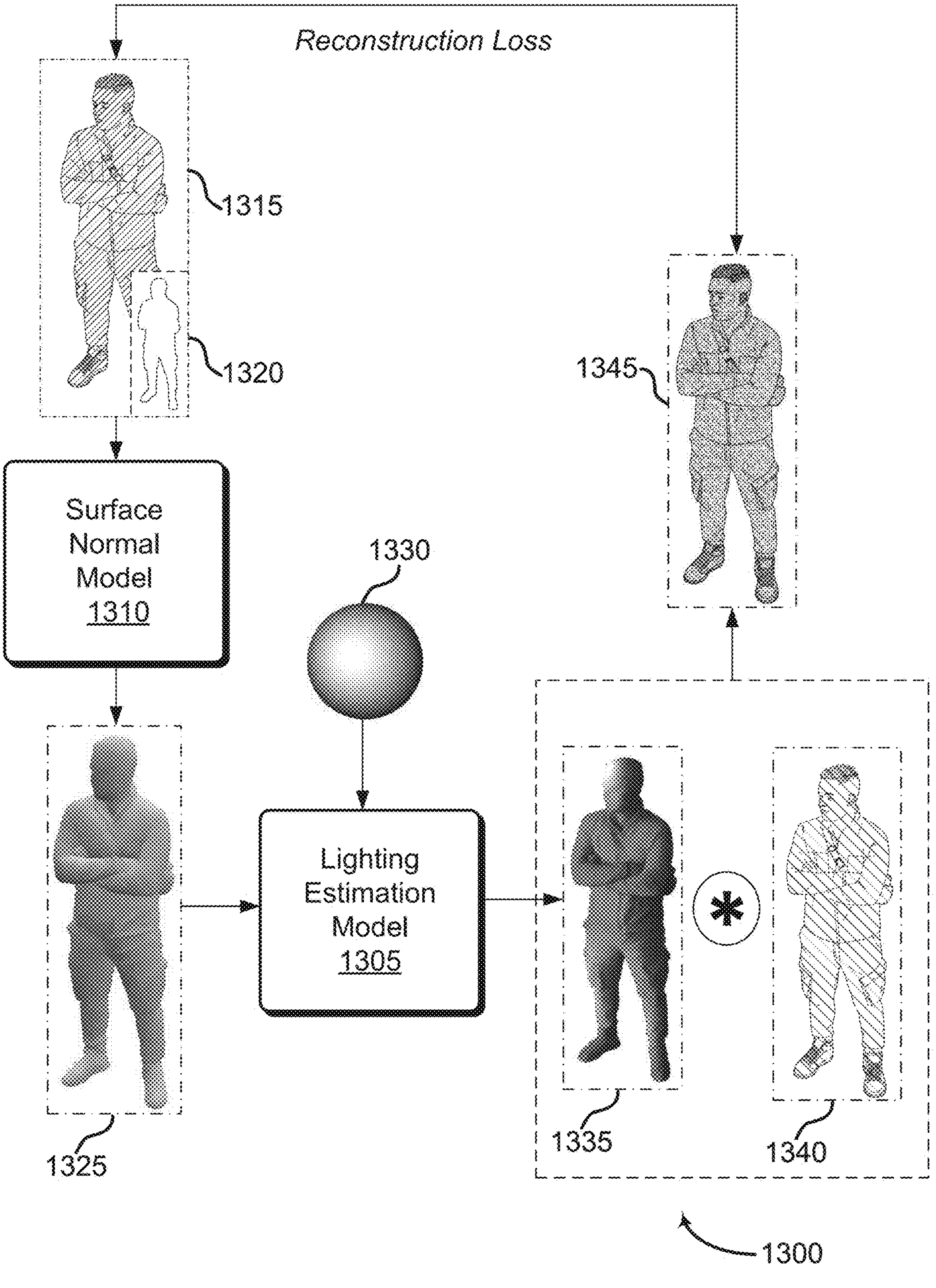
FIG. 13 shows an example of an example implementation of a training pipeline for training a lighting estimation model of a machine learning model according to aspects of the present disclosure.

FIG. 13 shows an example implementation of a training pipeline for training a lighting estimation model 1305 of a machine learning model according to aspects of the present disclosure. The example shown includes image generation apparatus 1300, training image 1315, mask 1320, surface normal map 1325, target lighting 1330, shading map 1335, ground-truth albedo map 1340, and output image 1345.

Image generation apparatus 1300 is an example of, or includes aspects of, the corresponding element described with reference to FIGS. 1, 3-6, 17, and 18. In one aspect, image generation apparatus 1300 includes surface normal model 1310 and lighting estimation model 1305.

Lighting estimation model 1305 is an example of, or includes aspects of, the corresponding element described with reference to FIGS. 4 and 18. Mask 1320 is an example of, or includes aspects of, the corresponding element described with reference to FIGS. 3 and 5. Surface normal map 1325 and target lighting 1330 are examples of, or include aspects of, the corresponding element described with reference to FIG. 4. Shading map 1335 is an example of, or includes aspects of, the corresponding element described with reference to FIGS. 3-5.

According to some aspects, a training component (such as the training component described with reference to FIG. 17) trains a lighting estimation function $f$ of Equation 3 implemented as a lighting estimation model (such as lighting estimation model 1305) by comparing an input image (e.g., training image 1315) and a reconstruction of the training image (e.g., output image 1345) from an estimated shading of the training image (e.g., shading map 1335):

$$\mathcal{L}_{recon} = \sum_i \|I_{recon} - I\|_2^2 = \sum_i \|\hat{S}_\phi \odot A_{GT} - I\|_2^2 \quad (17)$$

$\mathcal{L}_{recon}$ is the reconstruction loss, I is the training image, and $I_{recon}$ is the reconstructed training image obtained by multiplying, $\hat{S}_\phi$ (the shading map) and $A_{GT} \in \mathbb{R}^{w \times h \times 3}$ (a ground-truth albedo map of the training image I). In some embodiments, the ground-truth albedo map is included in the training set.

In an example, surface normal model 1310 generates surface normal map 1325 based on training image 1315 (e.g., an object image obtained by isolating an object from a training composite image using mask 1320, where the training composite image is included in the training set). Lighting estimation model 1305 generates shading map 1335 based on surface normal map 1325 and target lighting 1330. The image generation apparatus multiplies shading map 1335 and ground-truth albedo map 1340 to obtain output image 1345. The training component computes the reconstruction loss based on a comparison of training image 1315 and output image 1345. According to some aspects, the training component updates the parameters of the lighting estimation model based on the reconstruction loss.

According to some aspects, the shading estimation network is supervised in the image space, and therefore the image generation apparatus can use other image-based supervision signals to capture a physical plausibility of local and global shading:

$$L_{shade} = \mathcal{L}_{recon} + \lambda_v \mathcal{L}_{vgg} + \lambda_c \mathcal{L}_{cGAN} \quad (18)$$

Figure 18:
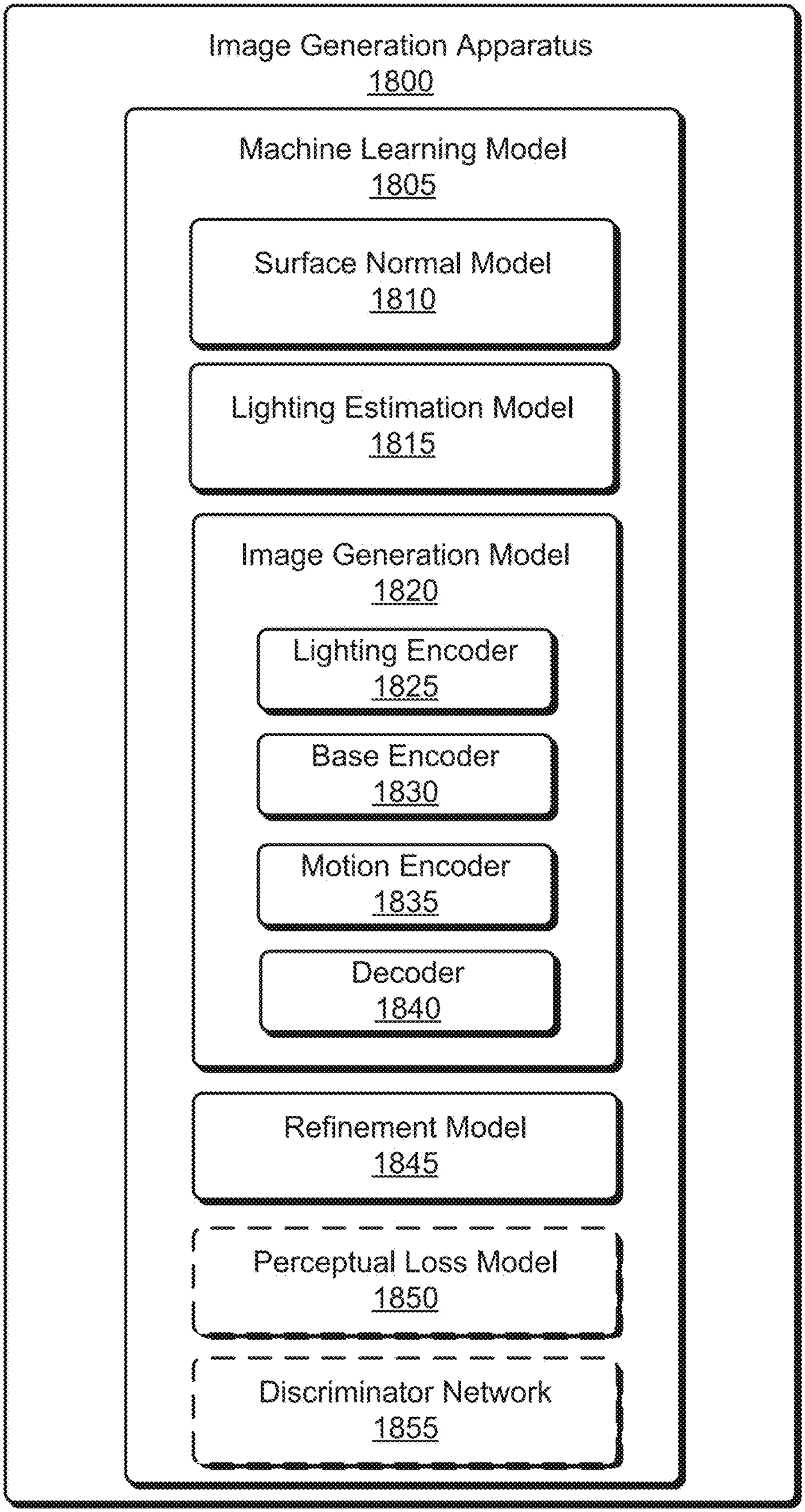
FIG. 18 shows an example implementation of a machine learning model of FIG. 17 in further detail according to aspects of the present disclosure.

$L_{shade}$ is the entire objective, $\mathcal{L}_{vgg}$ is a perceptual loss designed to penalize a difference between the reconstructed image $I_{recon}$ and the training image I in the deep feature space, $\mathcal{L}_{cGAN}$ is a conditional adversarial loss to evaluate a plausibility of the reconstructed shading with respect to the geometric structure, using {N, I} as a "real" condition and $\{N, I_{recon}\}$ as a "fake" condition to a discriminator network (such as the discriminator network described with reference to FIG. 18), and $\lambda_v$ and $\lambda_c$ control weights of the loss functions, respectively.

In some embodiments, the training component updates parameters of the lighting estimation model based on the perceptual loss $\mathcal{L}_{vgg}$. In some embodiments, the training component updates parameters of the lighting estimation model based on the conditional adversarial loss $\mathcal{L}_{cGAN}$. In some embodiments, the training component updates parameters of the lighting estimation model based on the entire objective $\mathcal{L}_{shade}$.

According to some aspects, the training component computes the perceptual loss $\mathcal{L}_{vgg}$ using a perceptual loss model (such as the perceptual loss model 1850 as described with reference to FIG. 18). In an example, the perceptual loss model $\phi_l$ is a pre-trained image classifier implemented as a convolutional neural network such as a very deep convolutional neural network (VGG) that is used to define the perceptual loss $\mathcal{L}_{vgg}$ as a combination of at least one of a feature reconstruction loss $\ell_{feat}$ and a style reconstruction loss $\ell_{style}$ that measure differences in content and style between images:

$$\ell_{feat}^{\phi_l,j}(\hat{y}, y) = \frac{1}{C_j H_j W_j}\left\|\phi_{l_j}(\hat{y}) - \phi_{l_j}(y)\right\|_2^2 \tag{19}$$

$$G_j^{\phi_l}(\hat{y})c, c' = \frac{1}{C_j H_j W_j}\sum_{h=1}^{H_j}\sum_{w=1}^{W_j}\phi_{l_j}(\hat{y})_{h,w,c}\phi_{l_j}(\hat{y})_{h,w,c'} \tag{20}$$

$$\ell_{style}^{\phi_l,j}(\hat{y}, y) = \left\|G_j^{\phi_l}(\hat{y}) - G_j^{\phi_l}(y)\right\|_F^2 \tag{21}$$

Referring to Equation 19, rather than encouraging pixels of an output image ŷ (e.g., the reconstructed image $I_{recon}$) to exactly match pixels of a target image y (e.g., the training image I), the feature reconstruction loss $\ell_{feat}$ encourages the pixels to have similar feature representations as computed by the perceptual loss model $\phi_l \cdot \phi_{l_j}(\hat{y})$ is activations of the $j^{th}$ convolutional layer of the perceptual loss model $\phi_l$ when processing the output image ŷ, where $\phi_{l_j}(\hat{y})$ is a feature map of shape $C_j \times H_j \times W_j$ and the feature reconstruction loss $\ell_{feat}$ is a squared, normalized Euclidean distance between feature representations. Using the feature reconstruction loss $\ell_{feat}$ encourages the output image ŷ to be perceptually similar to the target image y by penalizing the output image ŷ when it deviates in content from the target image y.

The style reconstruction loss $\ell_{style}$ penalizes differences in style (such as colors, textures, common patterns, etc.) between the output image y and the target image y.

$$G_j^{\phi_l}(\hat{y})$$

is a $C_j \times C_j$ Gram matrix with elements given by Equation 20. $\phi_{l_j}(y)$ gives $C_j$-dimensional features for each point on a $H_j \times W_j$ grid, and therefore $$G_j^{\phi_l}(\hat{y})$$

is proportional to an uncentered covariance of the $C_j$-dimensional features, treating each grid location as an independent sample and therefore capturing information about features that tend to activate together. Referring to Equation 21, the style reconstruction loss $\ell_{style}$ is the squared Frobenius norm of the difference between Gram matrices of the output image ŷ and the target image y. In some embodiments, $$\ell_{style}^{\phi_l,j}(\hat{y}, y)$$

is defined to be the sum of losses for each layer $j \in J$.

According to some aspects, the training component computes the conditional adversarial loss $\mathcal{L}_{cGAN}$ using the lighting estimation model as a generator G of a conditional generative adversarial network (cGAN) and a discriminator network (such as the discriminator network 1855 described with reference to FIG. 18) as a discriminator D of the cGAN:

$$\mathcal{L}_{cGAN} = (G, D) = \mathbb{E}_{x,y}[\log D(x, y)] + \mathbb{E}_{x,z}[\log(1 - D(x, G(x, z))] \tag{22}$$

The training component trains G to minimize the conditional adversarial loss $\mathcal{L}_{cGAN}$ against the adversarial D that tries to maximize it, i.e., $G^* = \arg\min_G \max_D \mathcal{L}_{cGAN}(G, D)$. In Equation 22, y={N, I} is the "real" condition, x={N, $I_{recon}$} is the "fake" condition, and z is a random noise vector.

Figure 14:
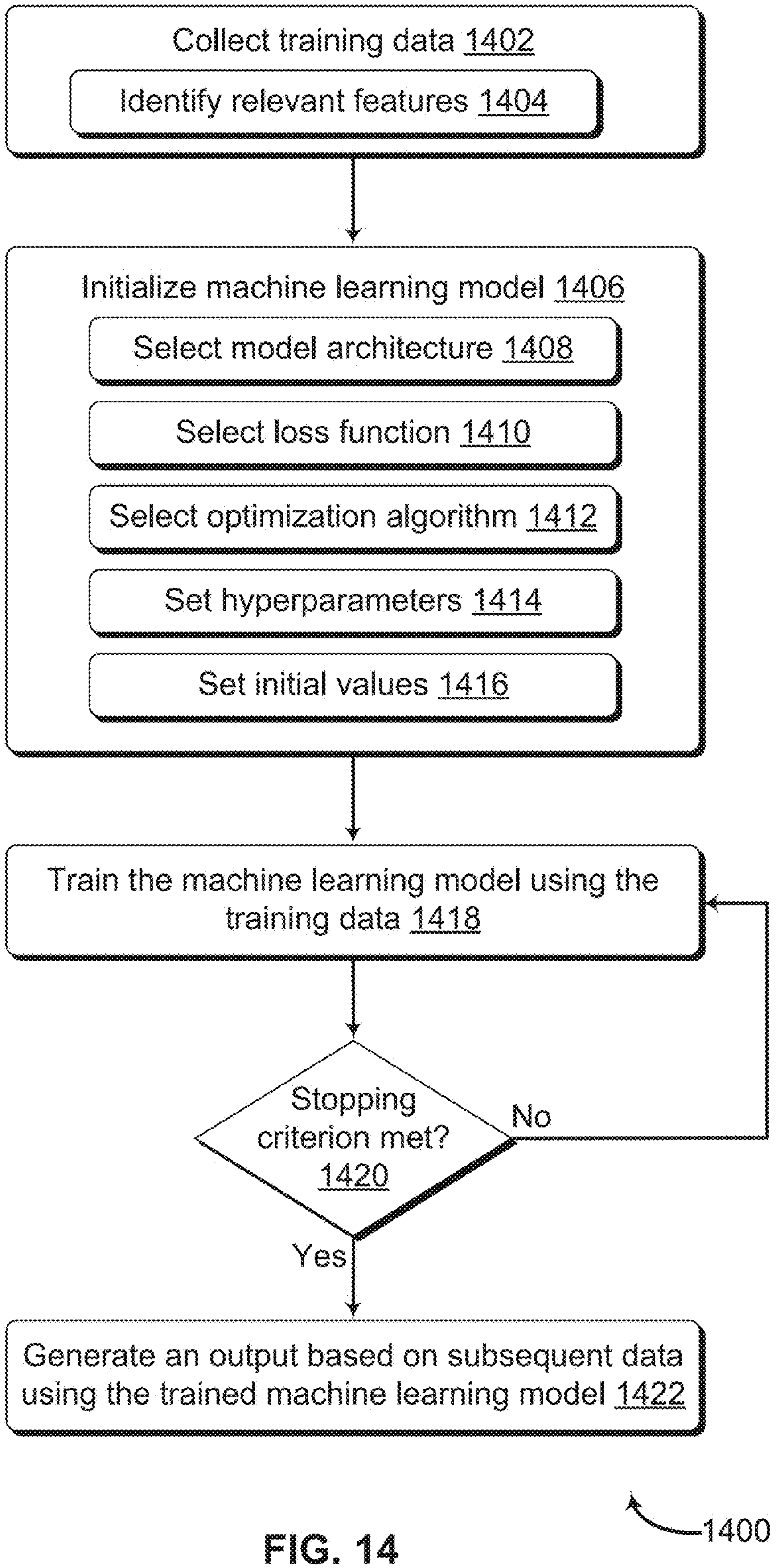
FIG. 14 shows an example of a flow diagram depicting an algorithm as a step-by-step procedure for training a machine learning model according to aspects of the present disclosure.

FIG. 14 shows an example of a flow diagram depicting an algorithm as a step-by-step procedure 1400 for training a machine learning model according to aspects of the present disclosure. In some embodiments, the procedure 1400 describes an operation of the training component 1725 described for configuring the machine learning model 1715 as described with reference to FIG. 17. The procedure 1400 provides one or more examples of generating training data, use of the training data to train a machine-learning model, and use of the trained machine-learning model to perform a task.

To begin in this example, a machine-learning system collects training data (block 1402) that is to be used as a basis to train a machine-learning model, i.e., which defines what is being modeled. The training data is collectable by the machine-learning system from a variety of sources. Examples of training data sources include public datasets, service provider system platforms that expose application programming interfaces (e.g., social media platforms), user data collection systems (e.g., digital surveys and online crowdsourcing systems), and so forth. Training data collection may also include data augmentation and synthetic data generation techniques to expand and diversify available training data, balancing techniques to balance a number of positive and negative examples, and so forth.

The machine-learning system is also configurable to identify features that are relevant (block 1404) to a type of task, for which the machine-learning model is to be trained. Task examples include classification, natural language processing, generative artificial intelligence, recommendation engines, reinforcement learning, clustering, and so forth. To do so, the machine-learning system collects the training data based on the identified features and/or filters the training data based on the identified features after collection. The training data is then utilized to train a machine-learning model.

In order to train the machine-learning model in the illustrated example, the machine-learning model is first initialized (block 1406). Initialization of the machine-learning model includes selecting a model architecture (block 1408) to be trained. Examples of model architectures include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc.

A loss function is also selected (block 1410). The loss function is utilized to measure a difference between an output of the machine-learning model (i.e., predictions) and target values (e.g., as expressed by the training data) to be used to train the machine-learning model. Additionally, an optimization algorithm is selected (1412) that is to be used in conjunction with the loss function to optimize parameters of the machine-learning model during training, examples of which include gradient descent, stochastic gradient descent (SGD), and so forth.

Initialization of the machine-learning model further includes setting initial values of the machine-learning model (block 1414), examples of which includes initializing weights and biases of nodes to improve efficiency in training and computational resources consumption as part of training. Hyperparameters are also set that are used to control training of the machine learning model, examples of which include regularization parameters, model parameters (e.g., a number of layers in a neural network), learning rate, batch sizes selected from the training data, and so on. The hyperparameters are set using a variety of techniques, including use of a randomization technique, through use of heuristics learned from other training scenarios, and so forth.

The machine-learning model is then trained using the training data (block 1418) by the machine-learning system. A machine-learning model refers to a computer representation that can be tuned (e.g., trained and retrained) based on inputs of the training data to approximate unknown functions. In particular, the term machine-learning model can include a model that utilizes algorithms (e.g., using the model architectures described above) to learn from, and make predictions on, known data by analyzing training data to learn and relearn to generate outputs that reflect patterns and attributes expressed by the training data.

Examples of training types include supervised learning that employs labeled data, unsupervised learning that involves finding an underlying structures or patterns within the training data, reinforcement learning based on optimization functions (e.g., rewards and/or penalties), use of nodes as part of "deep learning," and so forth. The machine-learning model, for instance, is configurable as including a plurality of nodes that collectively form a plurality of layers. The layers, for instance, are configurable to include an input layer, an output layer, and one or more hidden layers. Calculations are performed by the nodes within the layers through the hidden states through a system of weighted connections that are "learned" during training, e.g., through use of the selected loss function and backpropagation to optimize performance of the machine-learning model to perform an associated task.

As part of training the machine-learning model, a determination is made as to whether a stopping criterion is met (decision block 1420), i.e., which is used to validate the machine-learning model. The stopping criterion is usable to reduce overfitting of the machine-learning model, reduce computational resource consumption, and promote an ability of the machine-learning model to address previously unseen data, i.e., that is not included specifically as an example in the training data. Examples of a stopping criterion include but are not limited to a predefined number of epochs, validation loss stabilization, achievement of a performance improvement threshold, whether a threshold level of accuracy has been met, or based on performance metrics such as precision and recall. If the stopping criterion has not been met ("no" from decision block 1420), the procedure 1400 continues training of the machine-learning model using the training data (block 1418) in this example.

If the stopping criterion is met ("yes" from decision block 1420), the trained machine-learning model is then utilized to generate an output based on subsequent data (block 1422). The trained machine-learning model, for instance, is trained to perform a task as described above and therefore once trained is configured to perform that task based on subsequent data received as an input and processed by the machine-learning model.

Figure 15:
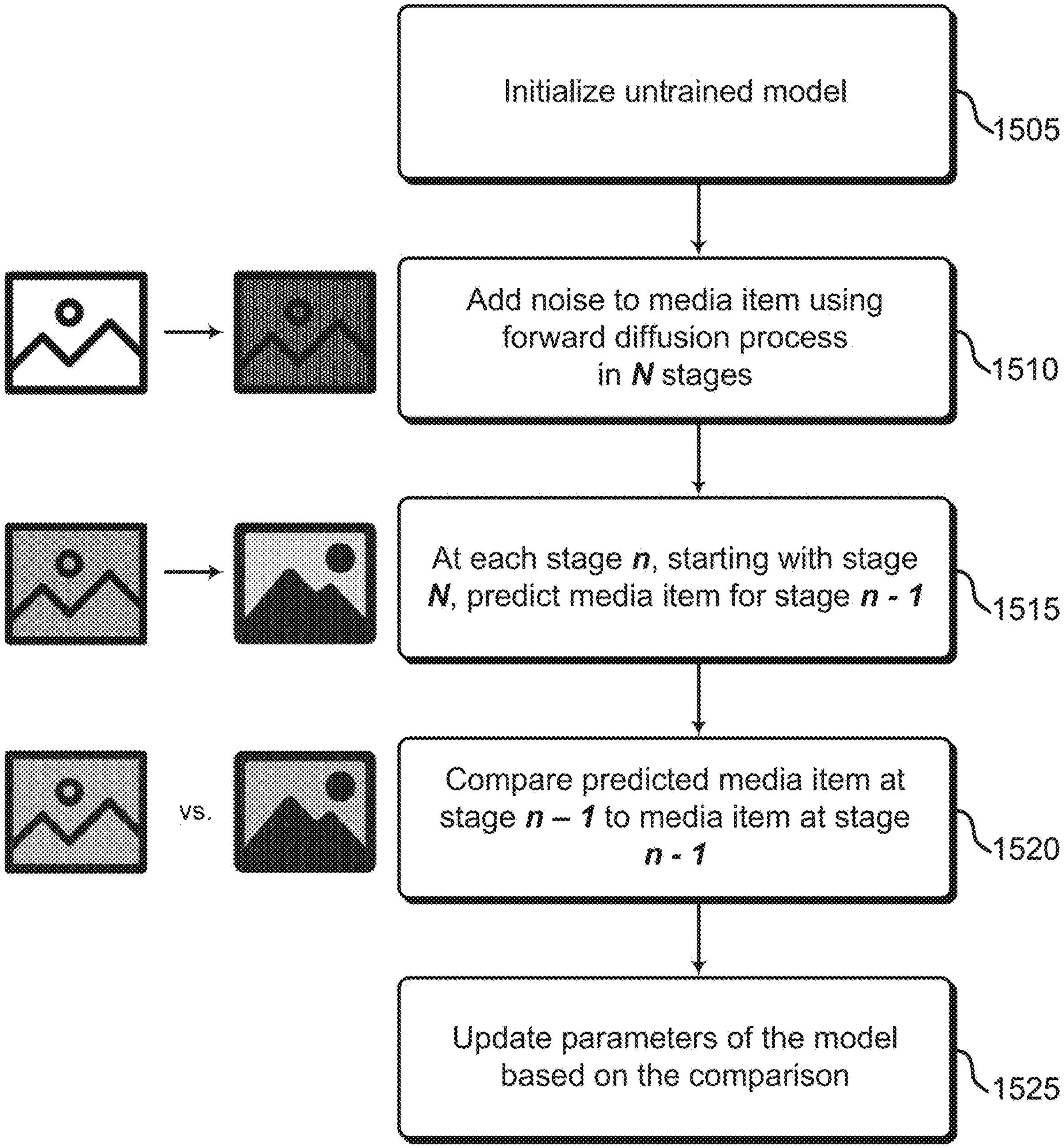
FIG. 15 shows an example of a method for training a diffusion model according to aspects of the present disclosure.

FIG. 15 shows an example of a method 1500 for training a diffusion model according to aspects of the present disclosure. In some embodiments, the method 1500 describes an operation of the training component 1725 described for configuring the image generation model 1820 as described with reference to FIGS. 17 and 18, respectively. The method 1500 represents an example for training a reverse diffusion process as described above with reference to FIG. 11. In some examples, these operations are performed by a system including a processor executing a set of codes to control functional elements of an apparatus, such as the guided diffusion model described in FIG. 7.

Additionally or alternatively, certain processes of method 1500 may be performed using special-purpose hardware. Generally, these operations are performed according to the methods and processes described in accordance with aspects of the present disclosure. In some cases, the operations described herein are composed of various substeps, or are performed in conjunction with other operations.

At operation 1505, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 1510, the system adds noise to a media item using a forward diffusion process in N stages. In some cases, the forward diffusion process is a fixed process where Gaussian noise is successively added to media item. In latent diffusion models, the Gaussian noise may be successively added to features in a latent space.

At operation 1515, the system at each stage n, starting with stage N, a reverse diffusion process is used to predict the output or features at stage n−1. For example, the reverse diffusion process can predict the noise that was added by the forward diffusion process, and the predicted noise can be removed from the noise input to obtain the predicted output. In some cases, an original media item is predicted at each stage of the training process.

At operation 1520, the system compares predicted output (or features) at stage n−1 to an actual media item (or features), such as the output at stage n−1 or the original input. For example, given observed data x, the diffusion model may be trained to minimize the variational upper bound of the negative log-likelihood $-\log p_\theta(x)$ of the training data.

At operation 1525, the system updates parameters of the model based on the comparison. For example, parameters of a U-Net may be updated using gradient descent. Time-dependent parameters of the Gaussian transitions can also be learned.

According to some aspects, the image generation model learns to predict a relighted image $I_\Phi$ from the noise based on a mean squared error obtained by a comparison of the relighted image $I_\Phi$ and a ground-truth relighted image $I_{\Phi,GT}$. In some embodiments, the image generation model also jointly learns an albedo map prediction task, $\mathcal{D}(\mathcal{D})=A$, by using a ground-truth albedo map $A_{GT}$ under a control of a white background (i.e. $B_i=1$) and identity shading (i.e. $\hat{S}_\Phi=1$) with a percentage (e.g., 10) of iterations to implicitly capture an intrinsic of an object without explicit intrinsic decomposition of the object's image, thereby increasing a quality of the relighted image $I_\phi$ over comparative relighted images generated by conventional image generation systems.

Accordingly, a method for training a machine learning model is described. One or more aspects of the method include obtaining a training set including a training image and a target lighting indicator; detecting a surface normal map of the training image; and training, using the training set, a lighting estimation model, to generate a shading map with lighting based on the target lighting and the surface normal map.

Some examples of the method further include generating an output image based on the surface normal map and the target lighting indicator. Some examples further include computing a reconstruction loss based on the output image and the training image. Some examples further include updating parameters of the lighting estimation model based on the reconstruction loss. Some examples of the method further include obtaining a ground-truth albedo map, wherein the output image is generated based on the ground-truth albedo map.

Some examples of the method further include computing a perceptual loss. Some examples further include updating parameters of the lighting estimation model based on the perceptual loss. Some examples of the method further include computing an adversarial loss. Some examples further include updating parameters of the lighting estimation model based on the adversarial loss.

Some examples of the method further include training an image generation model to generate a relighted image based on the shading map. Some examples of the method further include training a motion encoder of the image generation model to generate temporal consistency information based on the relighted image, wherein the image generation model uses the temporal consistency information to generate temporally consistent image frames.

Some examples of the method further include computing a noise contrastive estimation loss that optimizes a latent space for temporally related image frames, wherein the image generation model is trained based on the noise contrastive estimation loss.

Image Generation System

Figure 16:
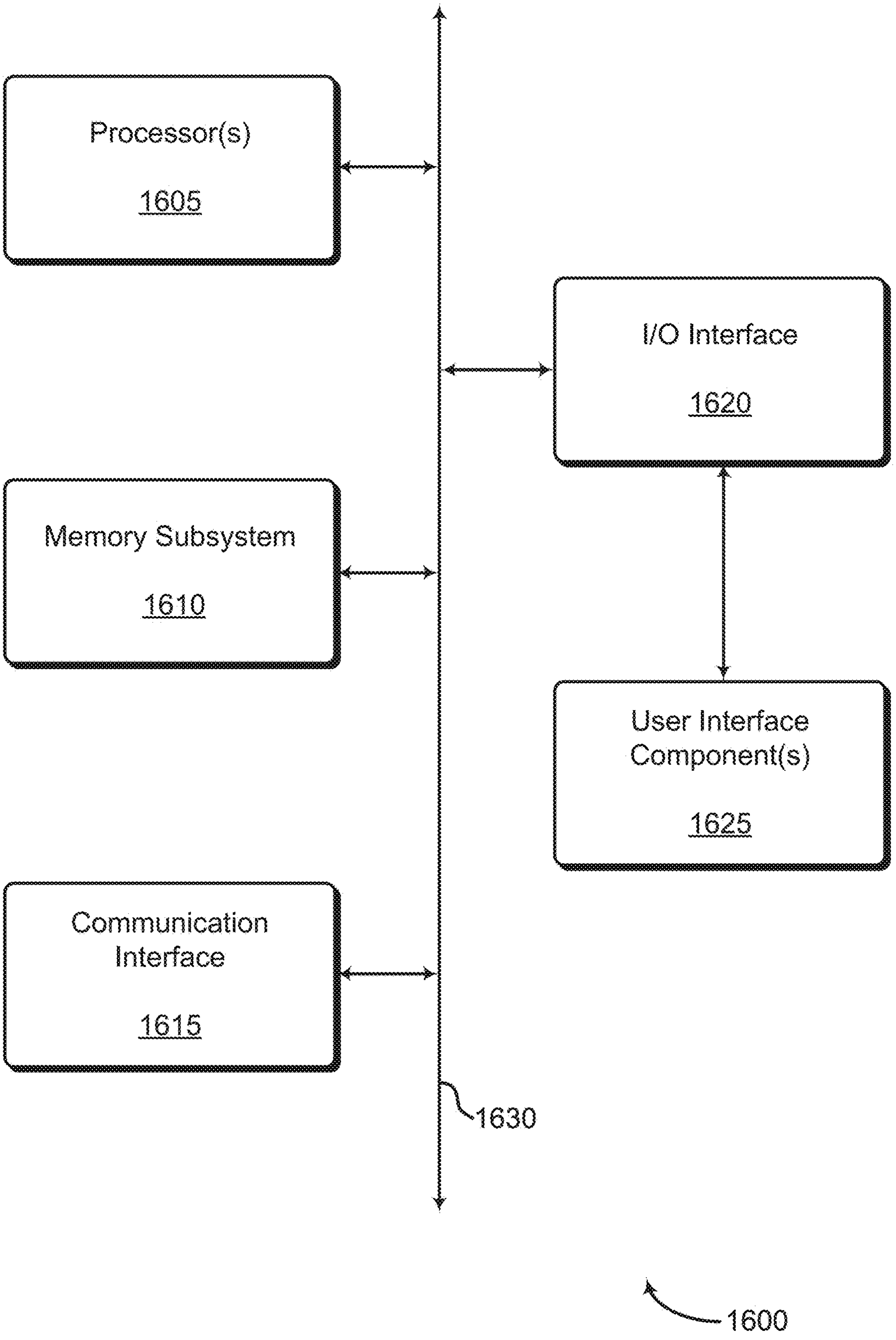
FIG. 16 shows an example of a computing device according to aspects of the present disclosure.

FIG. 16 shows an example of a computing device 1600 according to aspects of the present disclosure. The computing device 1600 may be an example of the image generation apparatus 1700 described with reference to FIG. 17. In one aspect, computing device 1600 includes processor(s) 1605, memory subsystem 1610, communication interface 1615, I/O interface 1620, user interface component(s) 1625, and channel 1630.

In some embodiments, computing device 1600 is an example of, or includes aspects of, the media generation model of FIG. 7. In some embodiments, computing device 1600 includes one or more processors 1605 that can execute instructions stored in memory subsystem 1610 to perform media generation.

According to some aspects, computing device 1600 includes one or more processors 1605. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1610 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1615 operates at a boundary between communicating entities (such as computing device 1600, one or more user devices, a cloud, and one or more databases) and channel 1630 and can record and process communications. In some cases, communication interface 1615 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1620 is controlled by an I/O controller to manage input and output signals for computing device 1600. In some cases, I/O interface 1620 manages peripherals not integrated into computing device 1600. In some cases, I/O interface 1620 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1620 or via hardware components controlled by the I/O controller.

According to some aspects, user interface component(s) 1625 enable a user to interact with computing device 1600. In some cases, user interface component(s) 1625 include an audio device, such as an external speaker system, an external display device such as a display screen, an input device (e.g., a remote-control device interfaced with a user interface directly or through the I/O controller), or a combination thereof. In some cases, user interface component(s) 1625 include a GUI.

Figure 17:
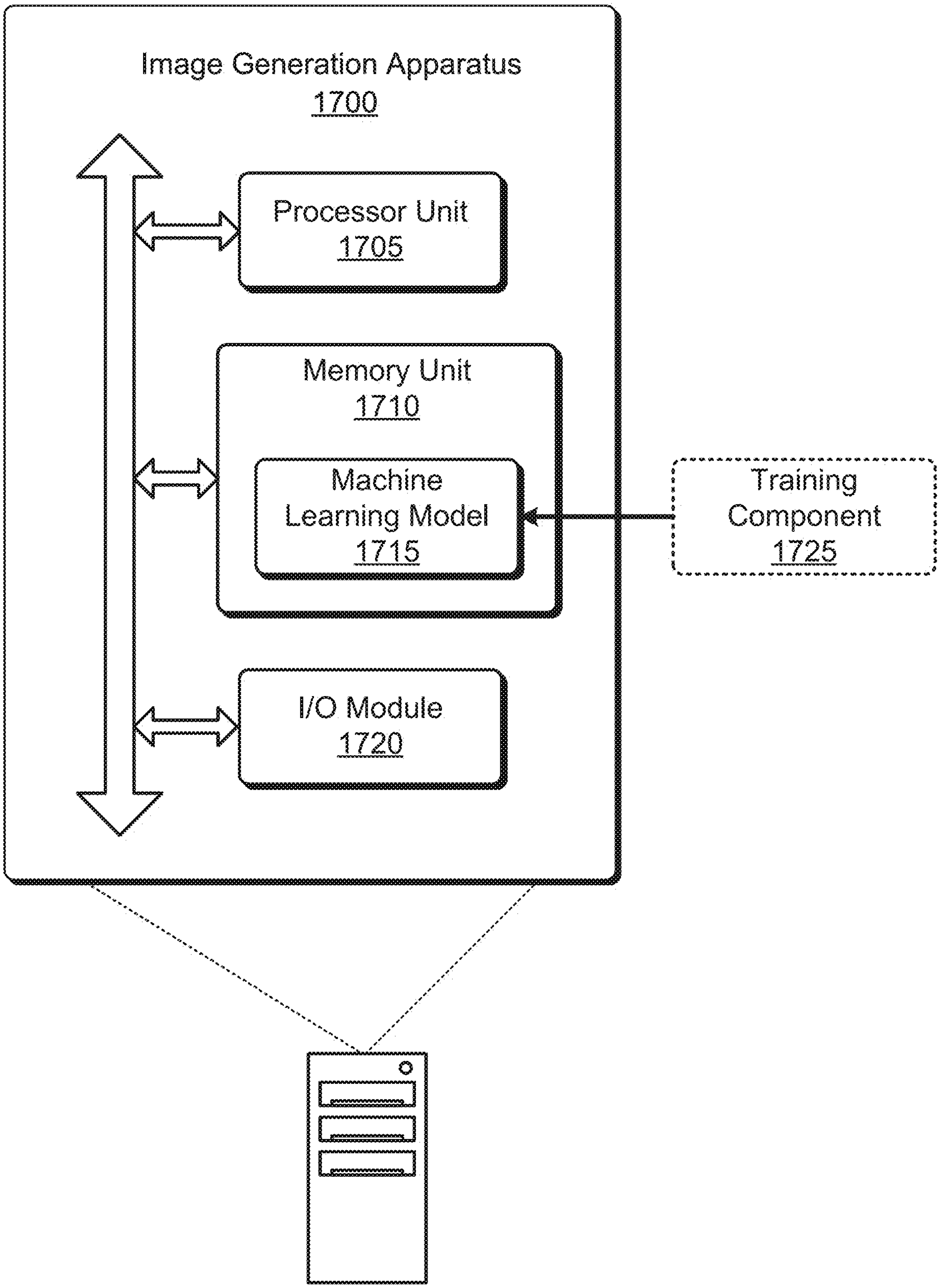
FIG. 17 shows an example implementation of an image generation apparatus according to aspects of the present disclosure.

FIG. 17 shows an example implementation of an image generation apparatus according to aspects of the present disclosure. Image generation apparatus 1700 is an example of, or includes aspects of, the corresponding element described with reference to FIGS. 1, 3-6, 13, 16, and 18. Image generation apparatus 1700 may include an example of, or aspects of, the guided diffusion model described with reference to FIG. 7 and the U-Net described with reference to FIG. 8. In some embodiments, image generation apparatus 1700 includes processor unit 1705, memory unit 1710, machine learning model 1715, I/O module 1720, and training component 1725. Training component 1725 updates parameters of the machine learning model 1715 stored in memory unit 1710. In some examples, the training component 1725 is located outside the image generation apparatus 1700.

Processor unit 1705 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 1705 is configured to operate a memory array using a memory controller. In other cases, a memory controller is integrated into processor unit 1705. In some cases, processor unit 1705 is configured to execute computer-readable instructions stored in memory unit 1710 to perform various functions. In some aspects, processor unit 1705 includes special purpose components for modem processing, baseband processing, digital signal processing, or transmission processing. According to some aspects, processor unit 1705 comprises one or more processors described with reference to FIG. 16.

Memory unit 1710 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 1705 to perform various functions described herein.

In some cases, memory unit 1710 includes a basic input/output system (BIOS) that controls basic hardware or software operations, such as an interaction with peripheral components or devices. In some cases, memory unit 1710 includes a memory controller that operates memory cells of memory unit 1710. For example, the memory controller may include a row decoder, column decoder, or both. In some cases, memory cells within memory unit 1710 store information in the form of a logical state. According to some aspects, memory unit 1710 is an example of the memory subsystem 1610 described with reference to FIG. 16.

According to some aspects, image generation apparatus 1700 uses one or more processors of processor unit 1705 to execute instructions stored in memory unit 1710 to perform functions described herein. For example, the image generation apparatus 1700 may obtain an object image and a target lighting indicator; generate, using a lighting estimation model, a shading map based on the object image and the target lighting indicator; and generate, using an image generation model, a relighted image based on the object image, the background image, and the shading map, wherein the relighted image depicts an object from the object image with lighting based on the target lighting indicator.

The memory unit 1710 may include a machine learning model 1715 trained to generate a shading map based on an object image and a target lighting indicator and to generate a relighted image based on the object image and the shading map, wherein the relighted image depicts an object from the object image with lighting based on the target lighting indicator. For example, after training, the machine learning model 1715 may perform inferencing operations as described with reference to FIGS. 9-11 to generate a shading map based on an object image and a target lighting indicator and to generate a relighted image based on the object image and the shading map. Machine learning model 1715 is an example of, or includes aspects of, the corresponding element described with reference to FIGS. 1 and 18.

In some embodiments, the machine learning model 1715 is an artificial neural network (ANN), such as the guided diffusion model described with reference to FIG. 7 and the U-Net described with reference to FIG. 8. An ANN can be a hardware component or a software component that includes connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

ANNs have numerous parameters, including weights and biases associated with each neuron in the network, which control the degree of connection between neurons and influence the neural network's ability to capture complex patterns in data. These parameters, also known as model parameters or model weights, are variables that determine the behavior and characteristics of a machine learning model.

In some cases, the signals between nodes comprise real numbers, and the output of each node is computed by a function of its inputs. For example, nodes may determine their output using other mathematical algorithms, such as selecting the max from the inputs as the output, or any other suitable algorithm for activating the node. Each node and edge are associated with one or more node weights that determine how the signal is processed and transmitted. In some cases, nodes have a threshold below which a signal is not transmitted at all. In some examples, the nodes are aggregated into layers.

The parameters of machine learning model 1715 can be organized into layers. Different layers perform different transformations on their inputs. The initial layer is known as the input layer and the last layer is known as the output layer. In some cases, signals traverse certain layers multiple times. A hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

Training component 1725 may train the machine learning model 1715. For example, parameters of the machine learning model 1715 can be learned or estimated from training data and then used to make predictions or perform tasks based on learned patterns and relationships in the data. In some examples, the parameters are adjusted during the training process to minimize a loss function or maximize a performance metric (e.g., as described with reference to FIGS. 12-15). The goal of the training process may be to find optimal values for the parameters that allow the machine learning model to make accurate predictions or perform well on the given task.

Accordingly, the node weights can be adjusted to improve the accuracy of the output (i.e., by minimizing a loss which corresponds in some way to the difference between the current result and the target result). The weight of an edge increases or decreases the strength of the signal transmitted between nodes. For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning model 1715 can be used to make predictions on new, unseen data (i.e., during inference).

According to some aspects, training component 1725 obtains a training set including a training image and a target lighting indicator. In some examples, training component 1725 trains, using the training set, a lighting estimation model to generate a shading map with the target lighting indicator based on the surface normal map. In some examples, training component 1725 computes a reconstruction loss based on an output image and the training image. In some examples, training component 1725 updates parameters of the lighting estimation model based on the reconstruction loss.

In some examples, training component 1725 obtains a ground-truth albedo map, where the output image is generated based on the ground-truth albedo map. In some examples, training component 1725 computes a perceptual loss. In some examples, training component 1725 updates parameters of the lighting estimation model based on the perceptual loss. In some examples, training component 1725 computes an adversarial loss. In some examples, training component 1725 updates parameters of the lighting estimation model based on the adversarial loss.

In some examples, training component 1725 trains an image generation model to generate a relighted image based on the shading map. In some examples, training component 1725 trains a motion encoder of the image generation model to generate temporal consistency information based on the relighted image, where the image generation model uses the temporal consistency information to generate temporally consistent image frames. In some examples, training component 1725 computes a noise contrastive estimation loss that optimizes a latent space for temporally related image frames, where the image generation model is trained based on the noise contrastive estimation loss.

I/O module 1720 receives inputs from and transmits outputs of the image generation apparatus 1700 to other devices or users. For example, I/O module 1720 receives inputs for the machine learning model 1715 and transmits outputs of the machine learning model 1715. According to some aspects, I/O module 1720 is an example of the I/O interface 1620 described with reference to FIG. 16.

FIG. 18 shows an example implementation of a machine learning model of FIG. 17 in further detail according to aspects of the present disclosure. Image generation apparatus 1800 is an example of, or includes aspects of, the corresponding element described with reference to FIGS. 1, 3-6, 13, and 17. In one aspect, image generation apparatus 1800 includes machine learning model 1805. Machine learning model 1805 is an example of, or includes aspects of, the corresponding element described with reference to FIGS. 1 and 17.

In one aspect, machine learning model 1805 includes surface normal model 1810, lighting estimation model 1815, image generation model 1820, refinement model 1845, perceptual loss model 1850, and discriminator network 1855.

Surface normal model 1810 is an example of, or includes aspects of, the corresponding element described with reference to FIG. 13. Lighting estimation model 1815 is an example of, or includes aspects of, the corresponding element described with reference to FIGS. 4 and 13. Image generation model 1820 is an example of, or includes aspects of, the corresponding element described with reference to FIGS. 3, 5, and 6. Refinement model 1845 is an example of, or includes aspects of, the corresponding element described with reference to FIG. 6.

According to some aspects, surface normal model 1810 comprises surface normal map detection parameters stored in the memory unit 1710 described with reference to FIG. 7. In some embodiments, surface normal model 1810 is implemented using a U-Net, such as the U-Net described with reference to FIG. 8. In some embodiments, surface normal model 1810 is implemented using a U-Net with pyramid vision transformer. According to some aspects, surface normal model 1810 is trained to detect a surface normal map of an object image. In some embodiments, a shading map is based on the surface normal map. According to some aspects, surface normal model 1810 detects a surface normal map of a training image.

According to some aspects, lighting estimation model 1815 comprises lighting estimation parameters stored in the memory unit 1710 described with reference to FIG. 7. According to some aspects, lighting estimation model is implemented using a U-Net, such as the U-Net described with reference to FIG. 8. According to some aspects, lighting estimation model 1815 is trained to generate a shading map based on an object image and a target lighting indicator. According to some aspects, lighting estimation model 1815 generates an output image based on the surface normal map and the target lighting indicator.

According to some aspects, image generation model 1820 comprises image generation parameters stored in the memory unit 1710 described with reference to FIG. 7. According to some aspects, image generation model 1820 is implemented as a diffusion model, such as the diffusion model described with reference to FIG. 7 using the U-Net described with reference to FIG. 8. According to some aspects, image generation model 1820 is trained to generate a relighted image based on the object image, a background image, and the shading map. In some examples, the relighted image depicts an object from the object image with lighting based on the background image and the target lighting indicator.

In some examples, image generation model 1820 obtains a noise map. In some examples, image generation model 1820 encodes the shading map and the background image to obtain lighting control information. In some examples, image generation model 1820 denoises the noise map based on the lighting control information.

In some examples, image generation model 1820 obtains a mask indicating a location of the object, where the relighted image is generated based on the mask. In some examples, image generation model 1820 obtains an input prompt describing the relighted image, where the relighted image is generated based on the input prompt. In some examples, image generation model 1820 generates an additional relighted image based on the temporal consistency information, where the relighted image and the additional relighted image include consecutive frames of a video. In some examples, image generation model 1820 generates a preliminary relighted image.

In one aspect, image generation model 1820 includes lighting encoder 1825, base encoder 1830, motion encoder 1835, and decoder 1840. Lighting encoder 1825, base encoder 1830, and decoder 1840 are examples of, or include aspects of, the corresponding elements described with reference to FIGS. 3 and 5. Motion encoder 1835 is an example of, or includes aspects of, the corresponding element described with reference to FIG. 5.

In some embodiments, lighting encoder 1825 is included in an encoder of a diffusion model, such as the diffusion model described with reference to FIG. 7, and is implemented as a ControlNet. ControlNet is a neural network structure to control image generation models by adding extra conditions. In some embodiments, a ControlNet architecture copies weights from some neural network blocks of the image generation model to create a "locked" copy and a "trainable" copy, where the "trainable" copy learns a condition and the "locked" copy preserves parameters of the original image generation model. The trainable copy can be tuned with a small dataset of image pairs, while preserving the locked copy ensures that original model is preserved.

In some embodiments, one or more zero convolution layers are added to the trainable copy. A "zero convolution" layer is 1×1 convolution with both weight and bias initialized as zeros. Before training, the zero convolution layers output all zeros. Accordingly, the ControlNet may not cause any distortion. As the training proceeds, the parameters of the zero convolution layers deviate from zero and the influence of the ControlNet on the output grows.

A ControlNet architecture can be used to control a diffusion U-Net, such as the U-Net described with reference to FIG. 7 (i.e., to add controllable parameters or inputs that influence the output). Encoder layers of the U-Net can be copied and tuned, and then zero convolution layers can be added. The output of the ControlNet can then be input to decoder layers of the U-Net.

In some embodiments, base encoder 1830 is included in an encoder of a diffusion model, such as the diffusion model described with reference to FIG. 7, and implemented using a U-Net, such as the U-Net described with reference to FIG. 8. In some embodiments, motion encoder 1835 is included in an encoder of a diffusion model, such as the diffusion model described with reference to FIG. 7, and is implemented as a ControlNet.

According to some aspects, decoder 1840 is included in a decoder of a diffusion model, such as the diffusion model described with reference to FIG. 7, and implemented using a U-Net, such as the U-Net described with reference to FIG. 8.

According to some aspects, refinement model 1845 comprises image refinement parameters stored in the memory unit 1710 of FIG. 7. According to some aspects, refinement model 1845 is implemented using a U-Net, such as the U-Net described with reference to FIG. 8. According to some aspects, refinement model 1845 is trained to generate a refined image based on the object image and a preliminary relighted image. In some embodiments, the refined image includes a detail from the object image that is absent from the preliminary relighted image.

According to some aspects, perceptual loss model 1850 comprises perceptual loss generation parameters stored in the memory unit 1710 of FIG. 7. According to some aspects, perceptual loss model 1850 is implemented as a pre-trained image classifier implemented as a convolutional neural network such as a very deep convolutional neural network (VGG). A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. The convolutional layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some aspects, discriminator network 1855 comprises discriminator parameters stored in the memory unit 1710 of FIG. 7. According to some aspects, discriminator network 1855 is implemented using a U-Net (such as the U-Net described with reference to FIG. 8).

Accordingly, an apparatus and a system for image generation is described. One or more aspects of the apparatus include at least one memory; at least one processor executing instructions stored in the at least one memory; a lighting estimation model comprising lighting estimation parameters stored in the at least one memory, the lighting estimation model trained to generate a shading map based on an object image and a target lighting indicator; and an image generation model comprising image generation parameters stored in the at least one memory, the image generation model trained to generate a relighted image based on the object image, a background image, and the shading map, wherein the relighted image depicts an object from the object image with lighting based on the background image and the target lighting indicator.

Some examples of the apparatus and system further include a lighting encoder configured to encode the shading map and the background image to obtain lighting control information. Some examples of the apparatus and system further include a base encoder configured to encode the lighting control information and the object image to obtain latent image features. Some examples of the apparatus and system further include a motion encoder trained to generate temporal consistency information based on the relighted image. Some examples of the apparatus and system further include a refinement model configured to generate a refined image based on the object image and a preliminary relighted image.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image generation, comprising:
- obtaining an object image and a target lighting indicator;
- generating, using a lighting estimation model, a shading map based on the object image and the target lighting indicator; and
- generating, using an image generation model, a relighted image based on the object image and the shading map, wherein the relighted image depicts an object from the object image with lighting based on the target lighting indicator.

2. The method of claim 1, wherein generating the shading map comprises:
- detecting a surface normal map of the object image, wherein the shading map is based on the surface normal map.

3. The method of claim 1, wherein generating the relighted image comprises:
- obtaining a noise map;
- encoding the shading map to obtain lighting control information; and
- denoising the noise map based on the lighting control information.

4. The method of claim 1, further comprising:
- obtaining a mask indicating a location of the object, wherein the relighted image is generated based on the mask.

5. The method of claim 1, further comprising:
- obtaining an input prompt describing the relighted image, wherein the relighted image is generated based on the input prompt.

6. The method of claim 1, further comprising:
- generating temporal consistency information based on the relighted image; and
- generating an additional relighted image based on the temporal consistency information, wherein the relighted image and the additional relighted image comprise consecutive frames of a video.

7. The method of claim 1, wherein generating the relighted image comprises:
- generating a preliminary relighted image; and
- generating a refined image based on the object image and the preliminary relighted image, wherein the refined image includes a detail from the object image that is absent from the preliminary relighted image.

8. The method of claim 1, further comprising:
- obtaining a background image, wherein the relighted image depicts the object from the object image in a scene from the background image, and wherein the lighting in the relighted image is based at least in part on the background image.

9. A system for image generation, comprising:
- at least one memory;
- at least one processor executing instructions stored in the at least one memory;
- a lighting estimation model comprising lighting estimation parameters stored in the at least one memory, the lighting estimation model trained to generate a shading map based on an object image and a target lighting indicator; and
- an image generation model comprising image generation parameters stored in the at least one memory, the image generation model trained to generate a relighted image based on the object image and the shading map, wherein the relighted image depicts an object from the object image with lighting based on the target lighting indicator.

10. The system of claim 9, wherein the image generation model further comprises:
- a lighting encoder configured to encode the shading map to obtain lighting control information.

11. The system of claim 9, wherein the image generation model further comprises:
- a base encoder configured to encode lighting control information and the object image to obtain latent image features.

12. The system of claim 9, wherein the image generation model further comprises:
- a motion encoder trained to generate temporal consistency information based on the relighted image.

13. The system of claim 9, the system further comprising:

a refinement model configured to generate a refined image based on the object image and a preliminary relighted image.

14. A non-transitory computer readable medium storing code for image generation, the code comprising instructions that, when executed by at least one processor, cause the at least one processor to perform operations comprising:

obtaining an object image and a target lighting indicator;

generating, using a lighting estimation model, a shading map based on the object image and the target lighting indicator; and generating, using an image generation model, a relighted image based on the object image and the shading map, wherein the relighted image depicts an object from the object image with lighting based on the target lighting indicator.

15. The non-transitory computer readable medium of claim 14, wherein generating the shading map comprises:

detecting a surface normal map of the object image, wherein the shading map is based on the surface normal map.

16. The non-transitory computer readable medium of claim 14, wherein generating the relighted image comprises:

obtaining a noise map;

encoding the shading map to obtain lighting control information; and denoising the noise map based on the lighting control information.

17. The non-transitory computer readable medium of claim 14, the code comprising instructions that, when executed by at least one processor, cause the at least one processor to perform operations comprising:

obtaining a mask indicating a location of the object, wherein the relighted image is generated based on the mask.

18. The non-transitory computer readable medium of claim 14, the code comprising instructions that, when executed by at least one processor, cause the at least one processor to perform operations comprising:

obtaining an input prompt describing the relighted image, wherein the relighted image is generated based on the input prompt.

19. The non-transitory computer readable medium of claim 14, the code comprising instructions that, when executed by at least one processor, cause the at least one processor to perform operations comprising:

generating temporal consistency information based on the relighted image; and generating an additional relighted image based on the temporal consistency information, wherein the relighted image and the additional relighted image comprise consecutive frames of a video.

20. The non-transitory computer readable medium of claim 14, wherein generating the relighted image comprises:

generating a preliminary relighted image; and generating a refined image based on the object image and the preliminary relighted image, wherein the refined image includes a detail from the object image that is absent from the preliminary relighted image.

* * * * *